US012092254B2

(12) United States Patent  
Hall, II et al.

(10) Patent No.: US 12,092,254 B2
(45) Date of Patent: Sep. 17, 2024

(54) CONNECTION VERIFIER

(71) Applicant: Oetiker NY, Inc., Lancaster, NY (US)

(72) Inventors: Thomas Edwin Hall, II, Buffalo, NY (US); Craig Andrew Corra, Clarence, NY (US); Joseph Thomas Adams, Howell, MI (US)

(73) Assignee: Oetiker NY, Inc., Lancaster, NY (US)

( * ) Notice: Subject to any disclaimer, the term of this patent is extended or adjusted under 35 U.S.C. 154(b) by 569 days.

(21) Appl. No.: 17/289,998

(22) PCT Filed: Oct. 31, 2019

(86) PCT No.: PCT/US2019/059162
§ 371 (c)(1),
(2) Date: Apr. 29, 2021

(87) PCT Pub. No.: WO2020/092768
PCT Pub. Date: May 7, 2020

(65) Prior Publication Data
US 2022/0003350 A1    Jan. 6, 2022

Related U.S. Application Data

(60) Provisional application No. 62/753,969, filed on Nov. 1, 2018, provisional application No. 62/883,323, filed on Aug. 6, 2019.

(51) Int. Cl.
F16L 55/07    (2006.01)
G01M 13/00    (2019.01)

(52) U.S. Cl.
CPC ............ F16L 55/07 (2013.01); G01M 13/00 (2013.01); F16L 2201/10 (2013.01)

(58) Field of Classification Search
None
See application file for complete search history.

(56) References Cited

U.S. PATENT DOCUMENTS

| | | | |
|---|---|---|---|
| 5,909,901 A | 6/1999 | Zillig et al. | |
| 6,210,192 B1 | 4/2001 | Hulme et al. | |
| 9,263,840 B1* | 2/2016 | Lazaro, Jr. | ............ G01L 5/0042 |
| 2002/0189334 A1* | 12/2002 | Ford | ...................... G01L 23/18 |
| | | | 73/114.19 |
| 2004/0066034 A1 | 4/2004 | Takayanagi et al. | |

(Continued)

FOREIGN PATENT DOCUMENTS

CN    101226103 A    7/2008
CN    103032645 A    4/2013
(Continued)

Primary Examiner — Nasima Monsur
(74) Attorney, Agent, or Firm — Harter Secrest & Emery LLP; Michael Nicholas Vranjes

(57) ABSTRACT

A connection verifier for engaging a fluid connection including a tube end form, a fluid connector, and a snap ring having one or more protrusions, the connection verifier comprising a boot including an aperture, and a probe having a leading edge operatively arranged to engage the snap ring, and a circuit arranged in the aperture, the circuit operatively arranged to detect one or more forces applied to the leading edge, wherein the connection verifier is operatively arranged to determine if the fluid connection is properly connected based on the one or more forces applied to the leading edge.

20 Claims, 21 Drawing Sheets

(56) References Cited

U.S. PATENT DOCUMENTS

| | | |
|---|---|---|
| 2005/0063125 A1 | 3/2005 | Kato |
| 2011/0133759 A1 | 6/2011 | Chamberlin |
| 2013/0014595 A1* | 1/2013 | Huizinga ............... G01L 5/28 |
| | | 29/829 |
| 2015/0251175 A1* | 9/2015 | Briggs ............ G01N 35/00732 |
| | | 422/547 |
| 2015/0345684 A1* | 12/2015 | Kujawski, Jr. ...... F16L 37/0885 |
| | | 285/86 |
| 2017/0003459 A1* | 1/2017 | Takeuchi ............. G02B 6/3895 |
| 2017/0307120 A1* | 10/2017 | Guest ................ F16L 37/0925 |

FOREIGN PATENT DOCUMENTS

| | | |
|---|---|---|
| CN | 103136568 A | 6/2013 |
| FR | 3065050 A1 | 10/2018 |
| JP | 2001193885 A | 12/1999 |
| JP | 2002139187 A | 5/2002 |
| JP | 2004125148 A | 4/2004 |
| JP | 2005069461 A | 3/2005 |
| JP | 2005291474 A | 10/2005 |
| JP | 2020514635 A | 5/2020 |

* cited by examiner

CONNECTION VERIFIER

CROSS-REFERENCE TO RELATED APPLICATIONS

The present application is the United States National Stage Application pursuant to 35 U.S.C. § 371 of International Patent Application No. PCT/US2019/059162, filed on Oct. 31, 2019, which application claims the benefit under Articles 4 and 8 of the Stockholm Act of the Paris Convention for the Protection of Industrial Property of U.S. Provisional Patent Application No. 62/883,323, filed on Aug. 6, 2019, and U.S. Provisional Patent Application No. 62/753,969, filed on Nov. 1, 2018, which applications are hereby incorporated by reference in their entireties.

FIELD

The present disclosure relates to a connection verifier for a fluid connection, and, more particularly, to a connection verifier that indicates the status of a connection on site and/or at a remote location, via wired or wireless wired transmission.

BACKGROUND

Fluid connectors are integral components for many applications, and especially for automotive applications. Since an automotive system is made up of various components such as a radiator, a transmission, and an engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible and/or rigid hoses that connect to each component by fluid connectors. Such fluid connectors typically include a retaining clip or snap ring carried on the fluid connector which is adapted to snap behind a raised shoulder of a tube end form when the tube end form is fully inserted into the fluid connector. If the tube end form is not fully inserted into the fluid connector, the fluid connection may fail causing fluids to leak out and possibly other more serious consequences.

Thus, there has been a long-felt need for a connection verifier to ensure that a fluid connection is securely connected.

SUMMARY

According to aspects illustrated herein, there is provided a connection verifier, comprising a boot, including a first top surface, a first bottom surface, a first radially outward facing surface, a first radially inward facing surface, a first aperture arranged between the radially outward facing surface and the first radially inward facing surface, and a probe extending from the first bottom surface, and a circuit arranged in the first aperture proximate the first bottom surface, the circuit operatively arranged to detect a force applied to the probe.

According to aspect illustrated herein, there is provided a connection verifier for engaging a fluid connection including a tube end form, a fluid connector, and a snap ring having one or more protrusions, the connection verifier comprising a boot, including a first top surface, a first bottom surface, a first radially outward facing surface, a first radially inward facing surface, a first aperture arranged between the first radially outward facing surface and the first radially inward facing surface, and a probe including an engaging edge operatively arranged to engage the snap ring, a circuit operatively arranged in the first aperture to detect a force applied to the probe, and a body arranged to engage the first aperture and enclose the circuit within the boot.

According to aspects illustrated herein, there is provided a connection verifier for engaging a fluid connection including a tube end form, a fluid connector, and a snap ring having one or more protrusions, the connection verifier comprising a boot including an aperture, and a probe having a leading edge operatively arranged to engage the snap ring, and a circuit arranged in the aperture, the circuit operatively arranged to detect one or more forces applied to the leading edge, wherein the connection verifier is operatively arranged to determine if the fluid connection is properly connected based on the one or more forces applied to the leading edge.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
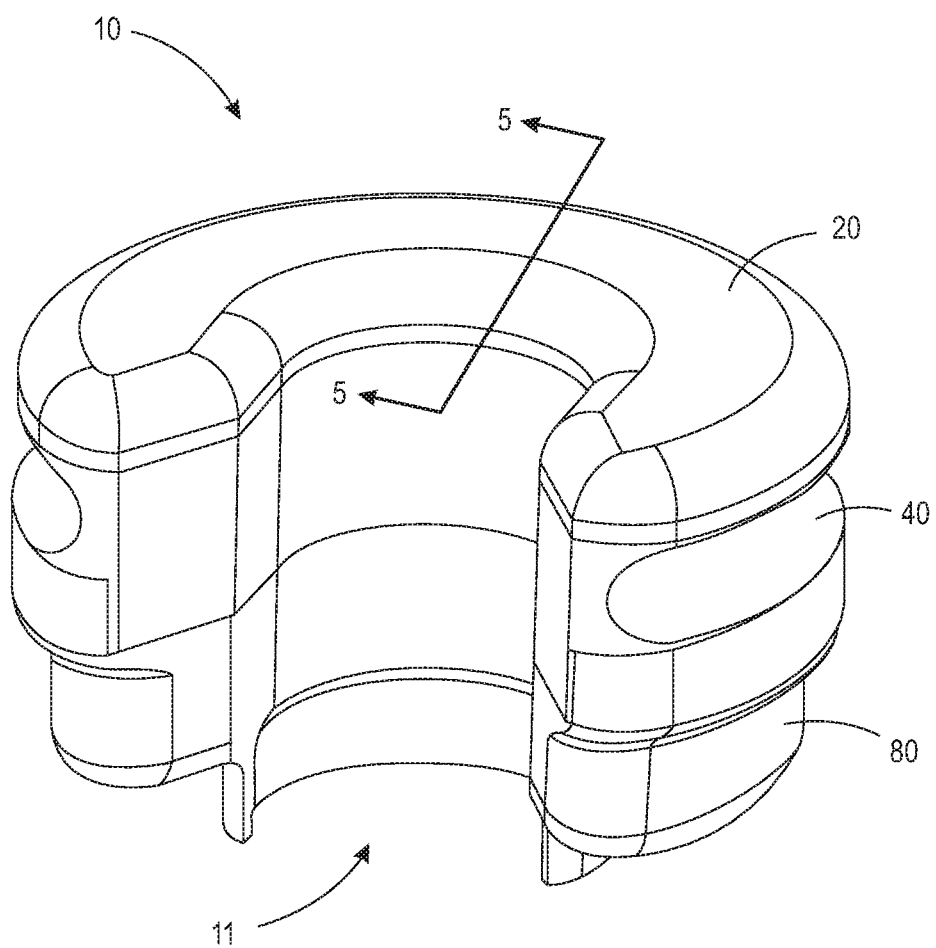
FIG. 1 is a perspective view of a connection verifier.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 2:
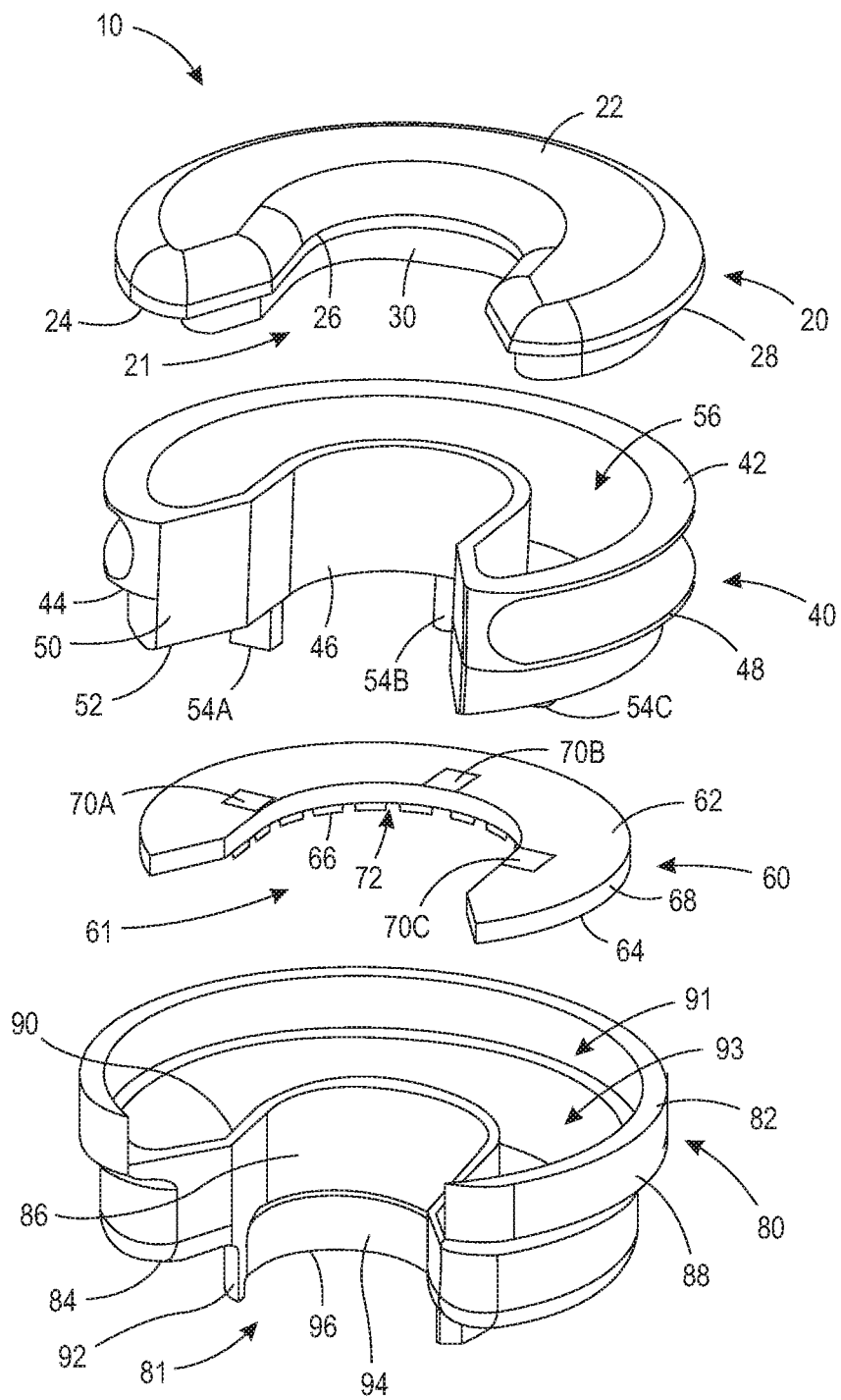
FIG. 2 is an exploded perspective view of the connection verifier shown in FIG. 1.

Adverting now to the figures, FIG. 1 is a perspective view of connection verifier 10. FIG. 2 is an exploded perspective view of connection verifier 10. Connection verifier 10 generally comprises cap 20, body 40, circuit or circuit board 60, boot 80, and opening 11. When connection verifier 10 is fully assembled, cap 20, body 40, circuit 60, and boot 80 are all non-rotatably connected. The following description should be read in view of FIGS. 1-2.

Cap 20 comprises top surface 22, bottom surface 24, radially inward facing surface 26, radially outward facing surface 28, and opening 21. Cap 20 is generally cylindrical; however, it should be appreciated that cap 20 may comprise any geometry suitable for mating with body 40, for example, square-, rectangular-, ovular-, ellipsoidal-, and triangular-shaped geometry. Cap 20 further comprises plug section 30 which is connected to and extends from bottom surface 24.

Radially inward facing surface 26 is substantially concentric to radially outward facing surface 28. Radially inward facing surface 26 opens up forming opening 21 as shown. Plug section 30 is arranged to engage aperture 56 of body 40. In some embodiments, cap 20 is secured to body 40 via an interference or press fit between plug section 30 and aperture 56. In some embodiments, cap 20 is secured to body 40 via adhesives or another suitable method of connection, for example, rivets, screws, nails, bolts, etc. It should be appreciated that in some embodiments, cap 20 may not comprise plug section 30, and may be secured to top surface 42. When cap 20 is secured to body 40, bottom surface 24 abuts against or is arranged substantially proximate to top surface 42.

Body 40 comprises top surface 42, bottom surface 44, radially inward facing surface 46, radially outward facing surface 48, and opening 41. Body 40 is generally cylindrical; however, it should be appreciated that body 40 may comprise any geometry suitable for mating with cap 20 and boot 80, for example, square-, rectangular-, ovular-, ellipsoidal-, and triangular-shaped geometry. Body 40 further comprises plug section 50 which is connected to and extends from bottom surface 44. Radially inward facing surface 46 is substantially concentric to radially outward facing surface 48. Radially inward facing surface 46 opens up forming opening 41 as shown. Plug section 50 is arranged to engage boot 80. Specifically, plug section 50 engages aperture 91 in boot 80 such that, when secured, bottom surface 52 abuts against or is arranged substantially proximate to surface 90. In some embodiments, body 40 is secured to boot 80 via an interference or press fit between plug section 50 and aperture 91. In some embodiments, body 40 is secured to boot 80 via adhesives or another suitable method of connection, for example, rivets, screws, nails, bolts, etc. It should be appreciated that in some embodiments, body 40 may not comprise plug section 50, and may be secured to top surface 82. When body 40 is secured to boot 80, bottom surface 44 abuts against or is arranged substantially proximate to top surface 82. Body 40 further comprises one or more vertical members connected to and extending from bottom surface 52. In some embodiments, body 40 does not comprise plug section 50 and the one or more vertical members are connected to and extend from bottom surface 44. In the embodiment shown, body 40 comprises three vertical members 54A-C connected to and extending from bottom surface 52. Vertical members 54A-C are circumferentially spaced such that they engage or extend to proximate sensors 70A-C arranged on top surface 62 of circuit 60, as will be discussed in greater detail below. In some embodiments, vertical member 54B is circumferentially spaced approximately 90 degrees from vertical member 54A, vertical member 54C is circumferentially spaced approximately 90 degrees from vertical member 54B, and vertical member 54A is circumferentially spaced approximately 180 degrees from vertical member 54C.

Figure 3:
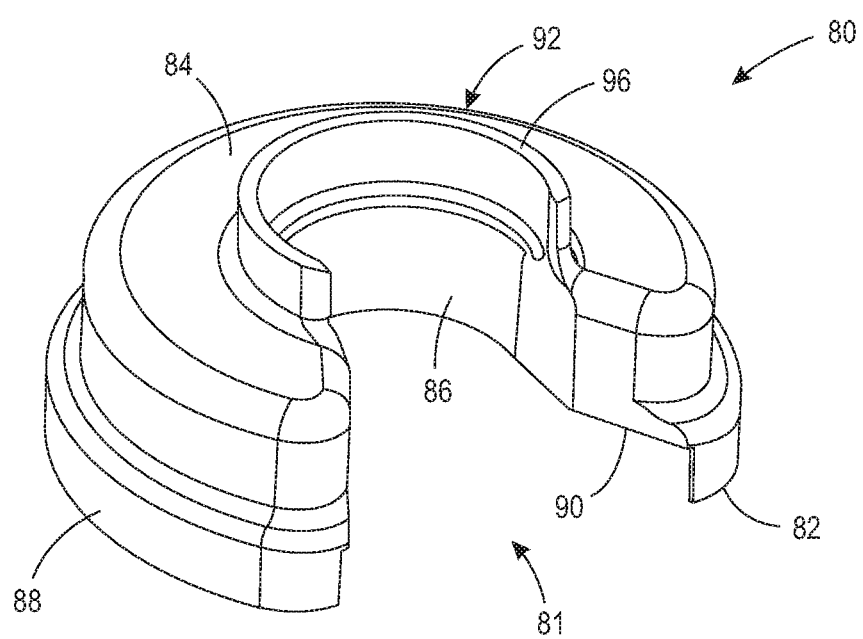
FIG. 3 is a bottom perspective view of the boot shown in FIG. 1.

FIG. 3 is a bottom perspective view of boot 80. Boot 80 comprises top surface 82, bottom surface 84, radially inward facing surface 86, radially outward facing surface 88, and opening 81. Boot 80 is generally cylindrical; however, it should be appreciated that boot 80 may comprise any geometry suitable for mating with body 40 and circuit 60, for example, square-, rectangular-, ovular-, ellipsoidal-, and triangular-shaped geometry. Radially inward facing surface 86 is substantially concentric to radially outward facing surface 88. Radially inward facing surface 86 opens up forming opening 81 as shown. Boot 80 further comprises aperture 91 which extends from top surface 82 to surface 90, and aperture 93 which extends from surface 90 to surface 98 (shown in FIGS. 5 and 6). As previously discussed, aperture 91 is arranged to engage plug section 50 such that bottom surface 44 abuts against or is arranged substantially proximate top surface 82, and bottom surface 52 abuts against or is arranged substantially proximate surface 90. When body 40 and boot 80 are fully engaged, vertical members 54A-C extend down into aperture 93. Circuit 60 is arranged to fit within aperture 93. In some embodiments, circuit 60 is secured to boot 80 via an interference or press fit between radially outward facing surface 68 and aperture 93. In some embodiments, circuit 60 is secured in boot 80 via adhesives or another suitable method of connection, for example, rivets, screws, nails, bolts, etc. Boot 80 further comprises probe 92 connected to and extending from bottom surface 84. Probe 92 comprises radially inward facing surface 94 and engaging edge 96. Engaging edge 96 is arranged to engage a snap ring of a fluid connection to determine if the fluid connection is properly connected, as will be discussed in greater detail below. In some embodiments, boot 80 is a singular molded compliant rubber element. In some embodiments, surface 98 further comprises one or more platforms 100. Platforms 100 are arranged between surface 98 and sensors 72.

Figure 4A:
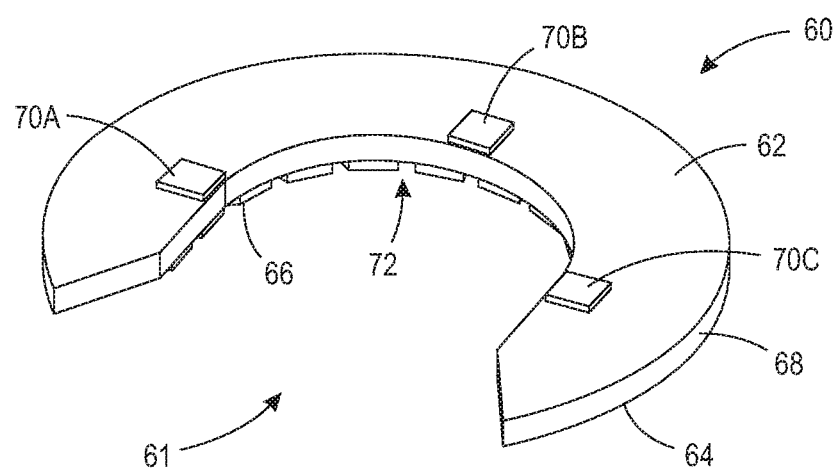
FIG. 4A is a top perspective view of the circuit shown in FIG. 2.
Figure 4B:
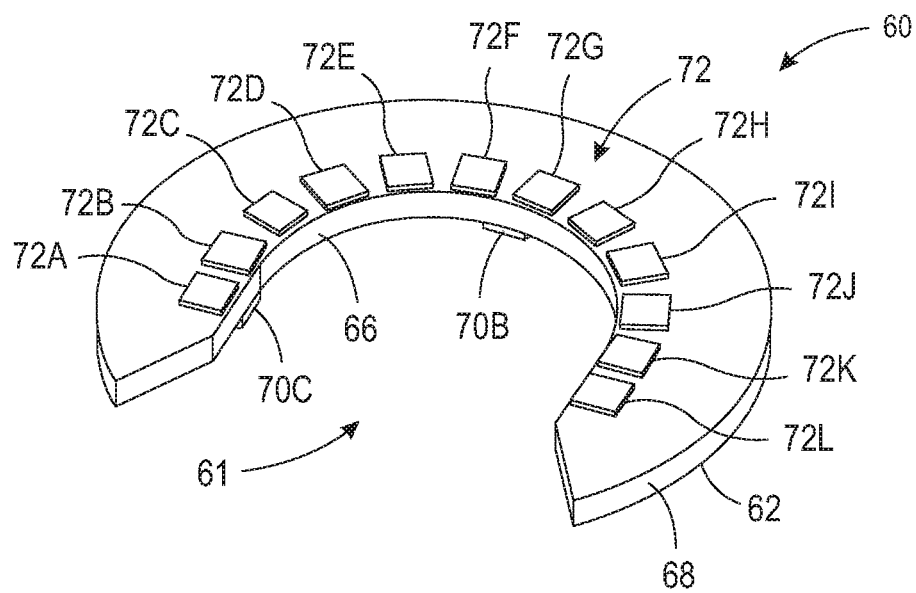
FIG. 4B is a bottom perspective view of the circuit shown in FIG. 2.
Figure 5:
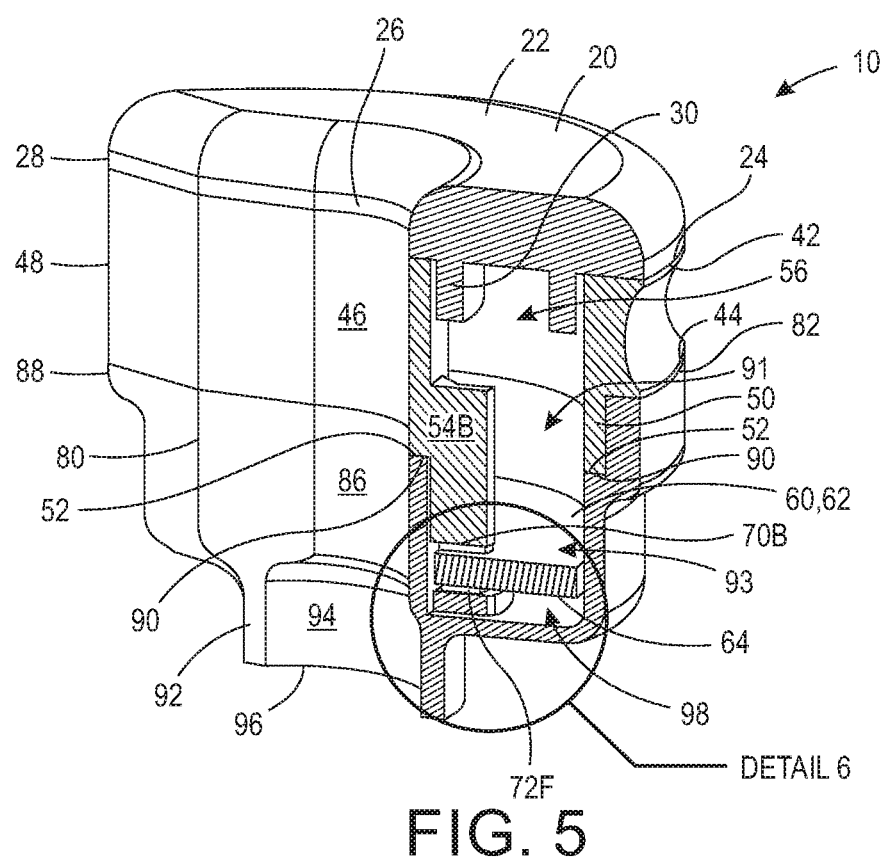
FIG. 5 is a cross-sectional view of the connection verifier taken generally along line 5-5 in FIG. 1.
Figure 6:
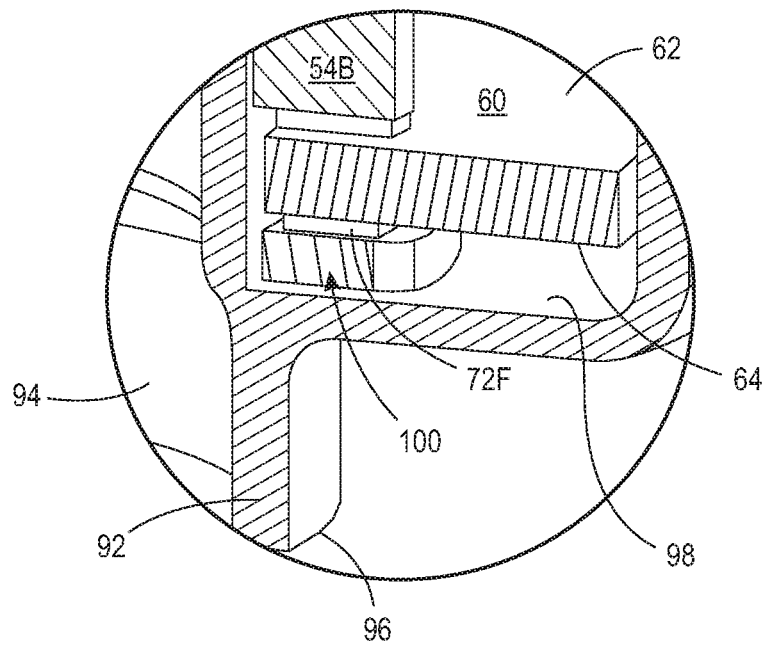
FIG. 6 is a detail view of the connection verifier taken generally along Detail 6 in FIG. 5.

FIG. 4A is a top perspective view of circuit 60. FIG. 4B is a bottom perspective view of circuit 60. FIG. 5 is a cross-sectional view of connection verifier 10 taken generally along line 5-5 in FIG. 1. FIG. 6 is a detail view of connection verifier 10 taken generally along Detail 6 in FIG. 5. The following description should be read in view of FIGS. 2-6.

In some embodiments, circuit 60 comprises a circuit board (e.g., a printed circuit board). Circuit 60 comprises top surface 62, bottom surface 64, radially inward facing surface 66, radially outward facing surface 68, and opening 61. Circuit 60 is generally disc-shaped or cylindrical; however, it should be appreciated that circuit 60 may comprise any geometry suitable for arrangement within boot 80, for example, square-, rectangular-, ovular-, ellipsoidal-, and triangular-shaped geometry. Radially inward facing surface 66 is substantially concentric to radially outward facing surface 68. Radially inward facing surface 66 opens up forming opening 61 as shown. As previously discussed, circuit 60 is arranged in boot 80, specifically aperture 93, such that bottom surface 64 abuts against or is arranged substantially proximate to surface 98 (see FIGS. 5 and 6). In some embodiments, circuit 60 is secured to boot 80 via an interference or press fit between radially outward facing surface 68 and aperture 93. In some embodiments, circuit 60 is secured in boot 80 via adhesives or another suitable method of connection, for example, rivets, screws, nails, bolts, etc. In some embodiments, circuit 60 is a printed circuit. Circuit 60 further comprises one or more sensors arranged on top surface 62. In the embodiment shown, circuit 60 comprises three sensors 70A-C arranged on top surface 62. Sensors 70A-C are differential/trigger sensors operatively arranged to interface with body 40, specifically vertical members 54A-C, respectively, to trigger test initiation (once the user has applied enough force to meet a predetermined threshold) and provide a differential reference force that may be used to compensate for uneven pressure by the user (i.e., sensors 70A-C determine if the user is applying an even pressure to connection verifier 10). Sensors 70A-C are circumferentially spaced about top surface 62 such that they are aligned with vertical members 54A-C, respectively. In some embodiments, sensor 70B is circumferentially spaced approximately 90 degrees from sensor 70A, sensor 70C is circumferentially spaced approximately 90 degrees from sensor 70B, and sensor 70A is circumferentially spaced approximately 180 degrees from sensor 70C. Circuit 60 further comprises one or more sensors 72 arranged on bottom surface 64. Sensors 72 are input sensors (an input sensor array) operatively arranged to detect forces applied to probe 92 so as to determine the presence of protrusion of a snap ring (i.e., if two protrusions are detected, then the fluid connection is properly connected). In the embodiment shown, circuit comprises sensors 72A-L circumferentially spaced about bottom surface 64. Sensors 72A-L will detect the same amount of force relative to each other when probe 92 is compressed against a flat surface, for example the tube end form shoulder surface (discussed in greater detail below), thus indicating that no protrusions are present (i.e., snapped behind the shoulder of the tube end form) and that the fluid connection is not properly connected. As shown in FIGS. 5 and 6, vertical member 54B extends down through aperture 93 from bottom surface 44 and terminates at sensor 70B. This arrangement is substantially the same for vertical member 54A and sensor 70A, and vertical member 54C and sensor 70C. When a force is applied to top surface 22, the compression that occurs between vertical members 54A-C and sensors 70A-C provide a base variable that allows the user to determine how much pressure has been applied. This base variable should be equal to or exceed a predetermined threshold. In some embodiments, sensors 70A-C and 72 comprise NextInput, Inc. ForceTouch™ Sensors or NextInput, Inc. ForceGauge™ Sensors. It should be appreciated, however, that sensors 70A-C and 72 may comprise any sensors suitable for obtaining force input from probe 92 and user applied pressure, respectively.

Circuit 60 is any suitable circuit that indicates when sensors 72 detect a suitable force at one or more (e.g., two) circumferential locations, thereby indicating a secure (or unsecure) fluid connection. In some embodiments, circuit 60 comprises an indicator device, such as an indicator light, to activate when sensors 72 detect a suitable force at one or more (e.g., two) circumferential locations, thereby indicating a secure connection. In some embodiments, circuit 60 comprises a vibration device (e.g., vibration motor) such that when sensors 72 detect a suitable force at one or more (e.g., two) circumferential locations, the vibration device vibrates connection verifier 10 to indicate a secure connection. For example, the vibration device may be a Haptic device which can take the form of a motor with an eccentric cam that vibrates or a piezo device that vibrates in response to an applied waveform. The piezo device can also produce an audible output. In some embodiments, circuit 60 comprises a sound device (e.g., a speaker and any other necessary sound equipment) such that when sensors 72 detect a suitable force at one or more (e.g., two) circumferential locations, the speaker outputs a noise to indicate a secure connection. Circuit 60 may further comprise a microcontroller which contains one or more central processing units (CPUs) along with memory and programmable input output peripherals. As is discussed in greater detail below, the microcontroller may be used to: activate the indicator light (or other indicator device) upon verification of a secure connection, initiate, using a transmission device, the transmission of a signal to a receiver at a remote location indicating a secure connection (or an unsecure connection), and activate a tool failure indicator.

Connection verifier 10 further comprises a transmission device that is electrically connected to circuit 60 and optionally a memory device or a microcontroller. The transmission device is arranged to transmit a signal to a remote location indicating that a fluid connection is secure, or unsecure. In some embodiments, the transmission device is arranged to send a signal via an electrical cable such as a wire or a fiber optic cable (i.e., a physical form of connection). The transmission device may use inter-integrated circuit (I²C), controller area network (CAN), local interconnect network (LIN), or any suitable communication protocol known in the art. In some embodiments, the transmission device is arranged to send a wireless communication to a receiver at a remote location which records the data sent (i.e., whether the fluid connection is securely connected, or not). The transmission device may transmit the data using any suitable method known in the art, for example, Bluetooth® communication, radio frequency, infrared, and Wi-Fi® communication. In some embodiments, the transmission device may transmit the fluid connection identification number, the connection verifier identification number, the remaining life of the connection verifier, the vehicle identification number (VIN), the part number (e.g., engine, radiator, etc.) and serial number for that part, verification that a fluid connection is secure, and/or verification that a fluid connection is not secure. In some embodiments, connection verifier can operate in conjunction with another device, such as a computer, to allow an electronic record to be kept of each inspection, and print a pass/fail label.

Connection verifier 10 may further comprise a tool failure indicator, such as a light, a vibration device, or a sound device, to indicate that connection verifier 10 should be replaced. In this embodiment, connection verifier 10 could, for example, include a memory device or a microcontroller that is programed with a predefined number, such that when connection verifier 10 is used a number of times equal to that predefined number, the tool failure indicator activates (i.e., the light turns on, the vibration device vibrates, the sound device creates a sound). The microcontroller may also tally the number of times connection verifier 10 is used, and using a preset remaining life calculation with a safety factor, continuously determine the remaining life of connection verifier.

Figure 7:
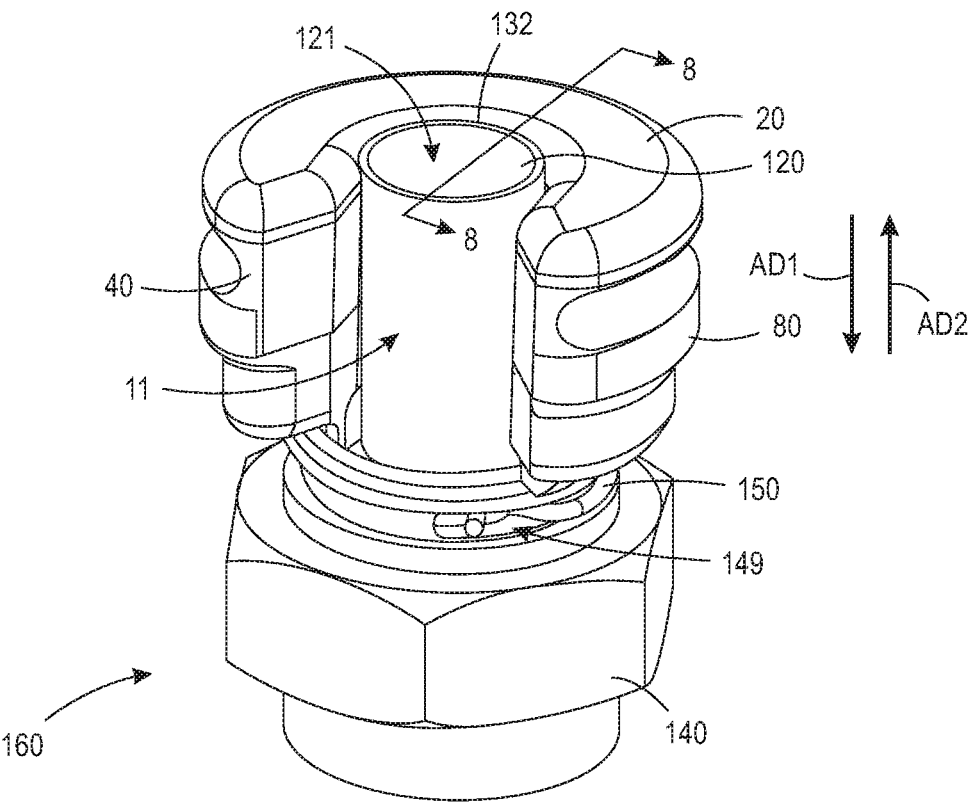
FIG. 7 is a perspective view of the connection verifier shown in FIG. 1 engaged with a fluid connection.
Figure 8:
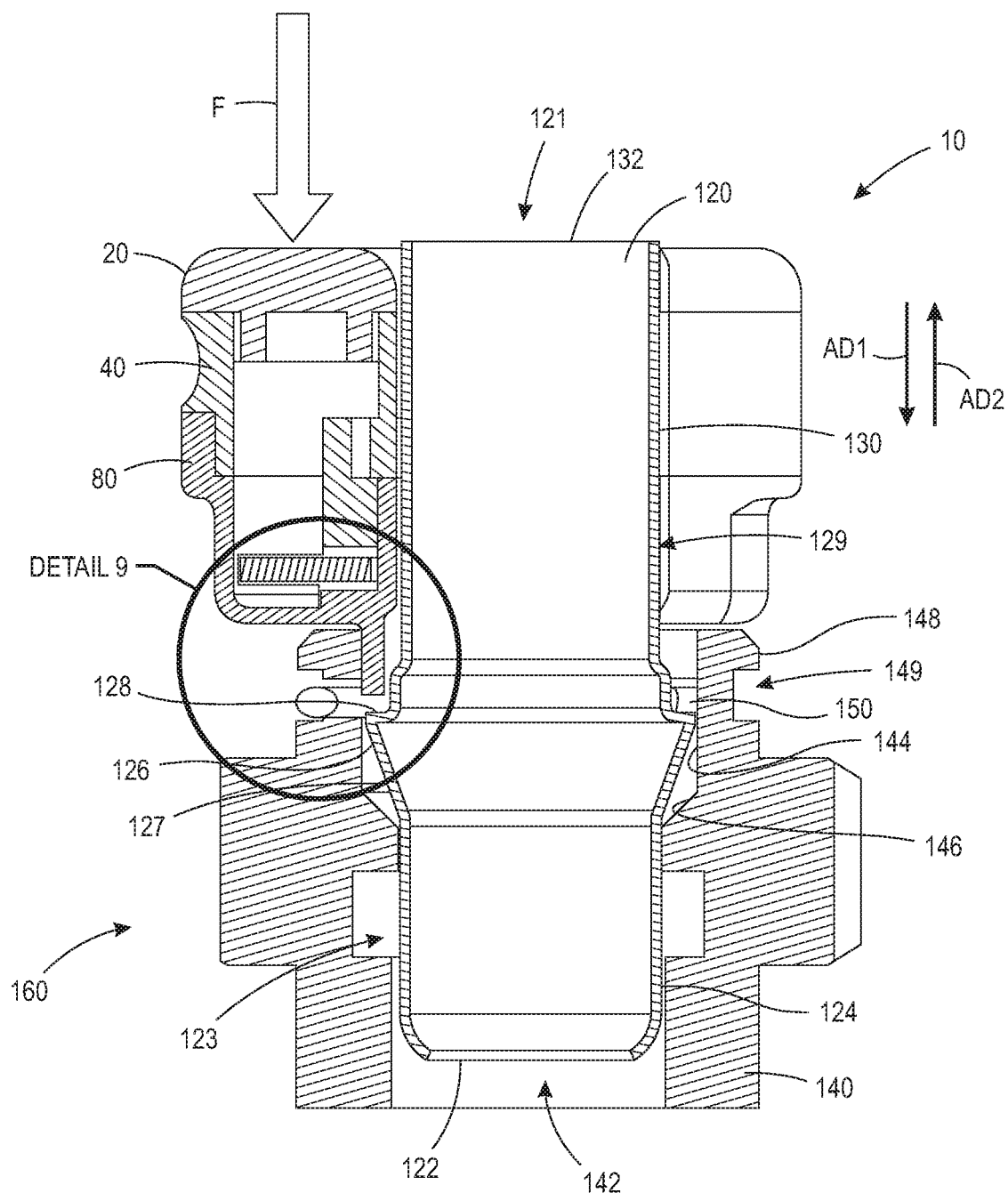
FIG. 8 is a cross-sectional view of the connection verifier taken generally along line 8-8 in FIG. 7.
Figure 9:
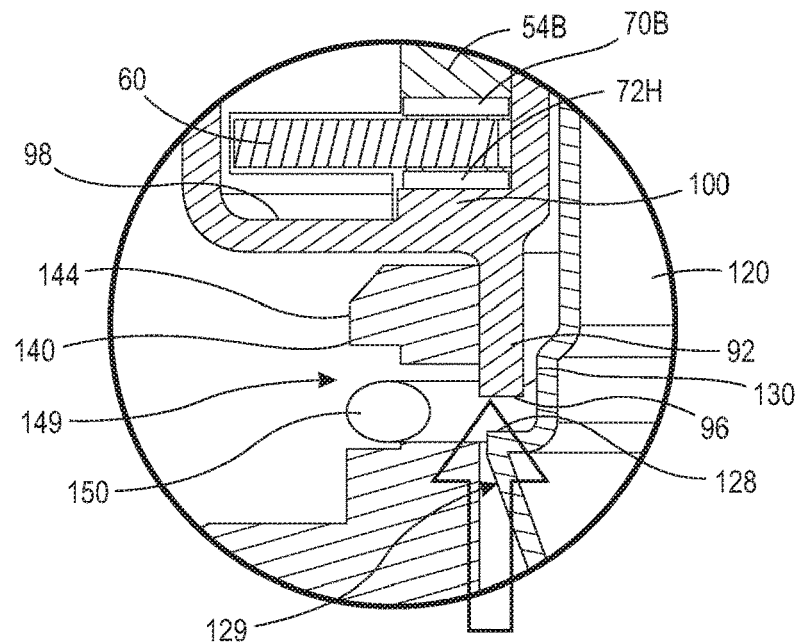
FIG. 9 is a detail view of the connection verifier taken generally along Detail 9 in FIG. 8.

FIG. 7 is a perspective view of connection verifier 10 engaged with fluid connection 160. FIG. 8 is a cross-sectional view of connection verifier 10 taken generally along line 8-8 in FIG. 7. FIG. 9 is a detail view of connection verifier 10 taken generally along Detail 9 in FIG. 8. The following description should be read in view of FIGS. 1-9. Fluid connection 160 generally comprises tube end form 120, fluid connector 140, and snap ring 150.

Tube end form 120 comprises end 122, section 123, shoulder 127, section 129, end 132, and through-bore 121. Through-bore 121 extends through tube end form 120 from end 122 to end 132. Section 123 is arranged between end 122 and shoulder 127 and comprises radially outward facing surface 124. Radially outward facing surface 124 includes a substantially constant diameter. Shoulder 127 is arranged between section 123 and section 129 and comprises radially outward facing surface 126. Radially outward facing surface 126 is a linear conical shape and increases in diameter in axial direction AD2. Section 129 is arranged between shoulder 127 and end 132 and comprises radially outward facing surface 130. In the embodiment shown, radially outward facing surface 130 comprises a variable diameter, having a constant diameter from end 132 until proximate shoulder surface 128, and then having an increased dimeter proximate shoulder surface 128. In some embodiments, radially outward facing surface 130 includes a substantially constant diameter. Shoulder 127 is connected to radially outward facing surface 130 via shoulder surface 128. Tube end form 120 is arranged to be inserted, specifically with end 122 first, into fluid connector 140. Tube end form 120 may utilize a linear ramp or a non-linear (i.e., curvilinear) ramp, and is inserted into fluid connector 140 until snap ring 150 snaps over shoulder 127. It should be appreciated that tube end form 120 may be any traditional tube end form comprising a ramp, which extends radially outward and axially on the outer surface of the tube end form, to displace a snap ring or wire clip within the fluid connector to secure the tube end form within the fluid connector. In order to determine that fluid connection 160 is securely connected, connection verifier 10 essentially verifies that snap ring 150 has "snapped" over shoulder 127, as will be discussed in greater detail below.

Fluid connector 140 comprises through-bore 142, radially inward facing surface 144, radially inward facing surface 146, and radially outward facing surface 148. Radially outward facing surface 148 comprises groove 149. Snap ring 150 is arranged in groove 149. Snap ring 150 comprises protrusions 152A, 152B, and 152C (see FIG. 10). Protrusions 152A-C extend radially inward through holes in groove 149 to engage shoulder 127, specifically, shoulder surface 128.

To verify that fluid connection 160 is securely connected, connection verifier 10 is first arranged around tube end form 120 through opening 11. Fluid connector 10 is then slid down tube end form 120 in axial direction AD1 until in the engaged position shown in FIG. 7. In FIGS. 7-9, fluid connector 10 has been slid down tube end form 120 in axial direction AD1 until probe 92, specifically engaging edge 96, contacts snap ring 150 or shoulder surface 128 (not shown). The user applies a force to top surface 22 or connection verifier 10 that is equal to or greater than a predetermined threshold, as determined by sensors 70A-C. If leading edge 96 is in contact with one or more protrusions, the user applied force creates a force on probe 92 which is detected by one or more sensors 72 that are arranged at the circumferential position of the one or more protrusions. The sensor that detects the force of the protrusion on probe 92 will read at a higher level of force than the adjacent or other sensors, which indicates that a protrusion exists and that protrusion has properly "snapped" over shoulder 127. In some embodiments, if sensors 70 detect that at least two protrusions have properly "snapped" over shoulder 127, then it is determined that fluid connection 160 is properly connected. As shown in FIG. 9, probe 92 is slid down between tube end form 120 and fluid connector 140. Specifically, probe 92 is slid between radially outward facing surface 130 and radially inward facing surface 144 to engage one or more of protrusions 150A-C of snap ring 150. If snap ring 150 is not arranged on fluid connector 140, then engaging edge 96 would continue down to shoulder surface 128 (not shown). The user applied force would, in this instance, create a force on probe 92; however, the force on probe 92 would be equally distributed about leading edge 96. As such, sensors 72A-L would all read at the same level of force, which indicates that no protrusion is present and that snap ring 150 is either not connected or not connected properly to fluid connection 160.

Figure 10:
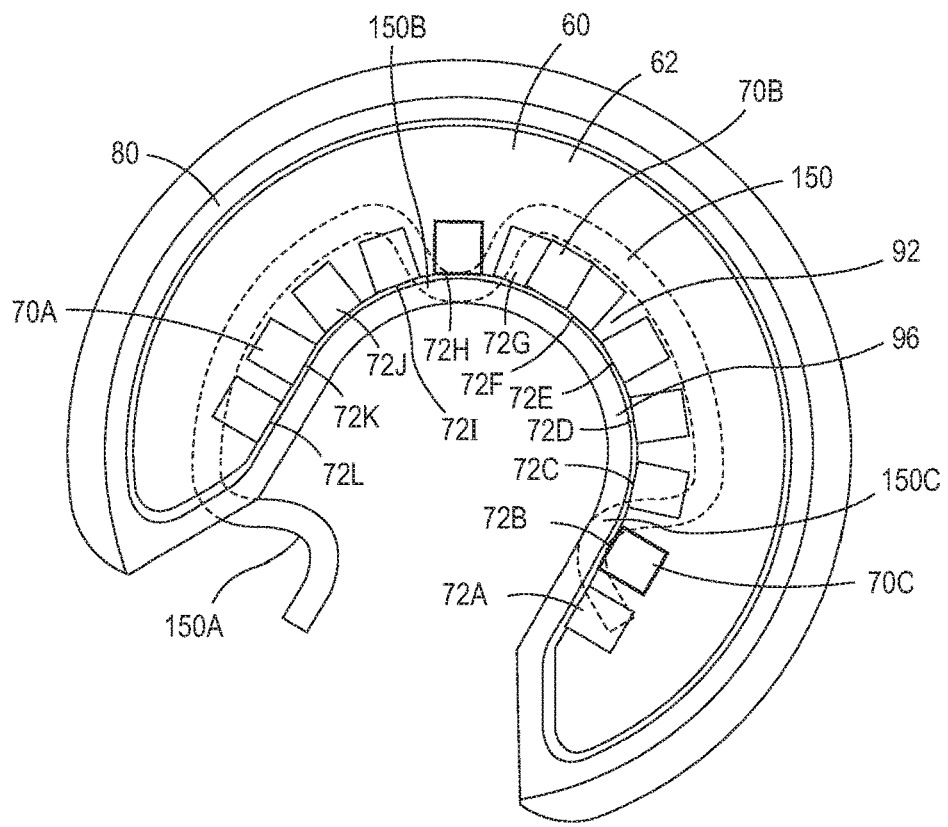
FIG. 10 is an elevational view of the circuit and the boot interacting with a snap ring.

FIG. 10 is an elevational view of circuit 60 and boot 80 interacting with snap ring 150. Circuit 60 is shown translucent and probe 92 is shown in dotted lines so that the engagement of leading edge 96 with protrusions 150A-C can be more easily seen. As shown in FIG. 10, the user applied force causes leading edge 96 to interact with, in this instance, protrusions 150B and 150C. This interaction causes deflection in boot 92 and resultant forces on at least sensor 72H, which is aligned circumferentially with protrusion 150B, and sensor 72B, which is aligned circumferentially with protrusion 150C. The resultant forces on sensors 72H and 72B are substantially higher than the resultant forces on sensors 72A, 72C-G, and 72I-L, which indicates that there are two protrusions (e.g., protrusions 150B-C) present and fluid connection 160 is properly connected.

Sensors 72 detect the pressure gradient or change in force along the circumference of probe 92 and circuit 60 and/or microcontroller and/or computer determine, based on the pressure gradient, whether there is a presence of one or more protrusions and if so, if tube end form 120 is properly connected to fluid connector 140.

In some embodiments, circuit 60 comprises a plurality of conductive pads in place of sensors 72A-H. In this embodiment, platforms 100 or surface 98 would contact the conductive pads directly and behave like individual switches. Boot 80 may comprise metal or a similar conductive material which would be electrically bonded to the system ground. The conductive input pads would be monitored by a microcontroller and pulled up. When surface 98 or platforms 100 contact the conductive input pads, they create a short to ground which would pull the inputs low, which the microcontroller would detect (edge triggered event).

In some embodiments, circuit 60 is flexible and arranged on surface 98. In this embodiment, one or more sensors arranged on circuit 60 detect deflection of boot 80. When the deflection of probe 92 in a circumferential location is equal to a predetermined distance, it is determined that a protrusion of the snap ring is present.

Figure 11:
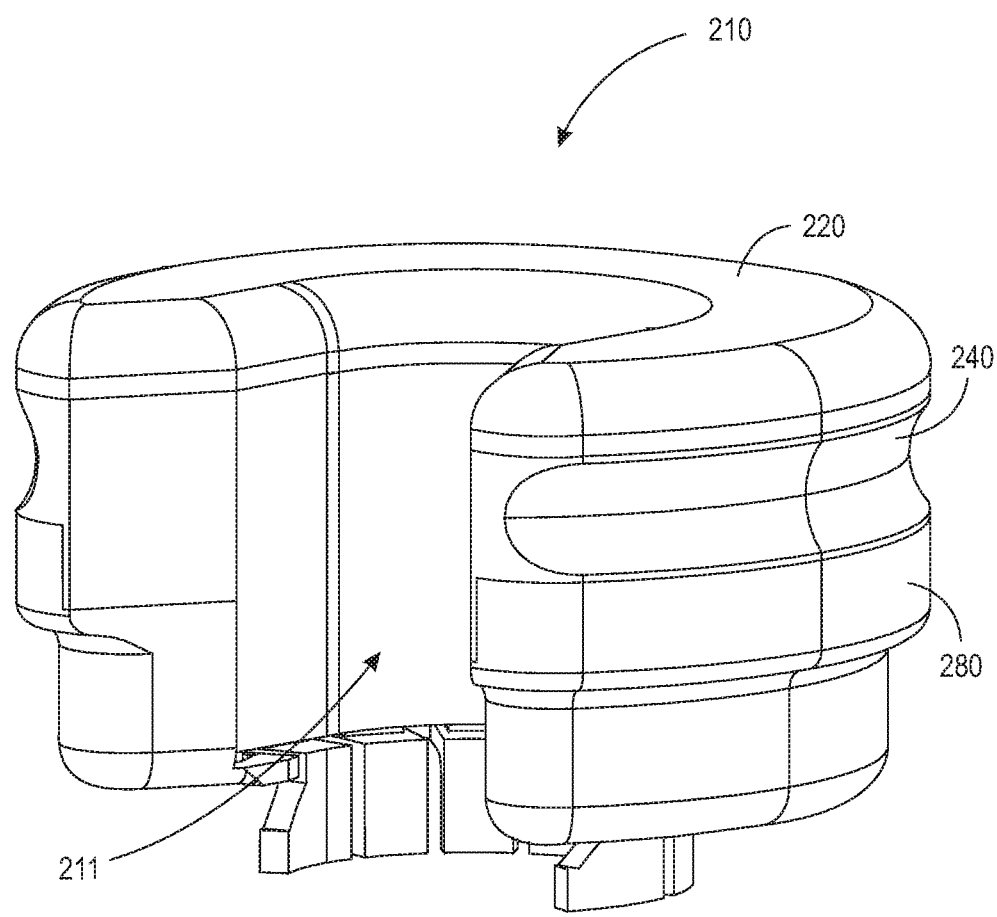
FIG. 11 is a perspective view of a connection verifier.
Figure 12:
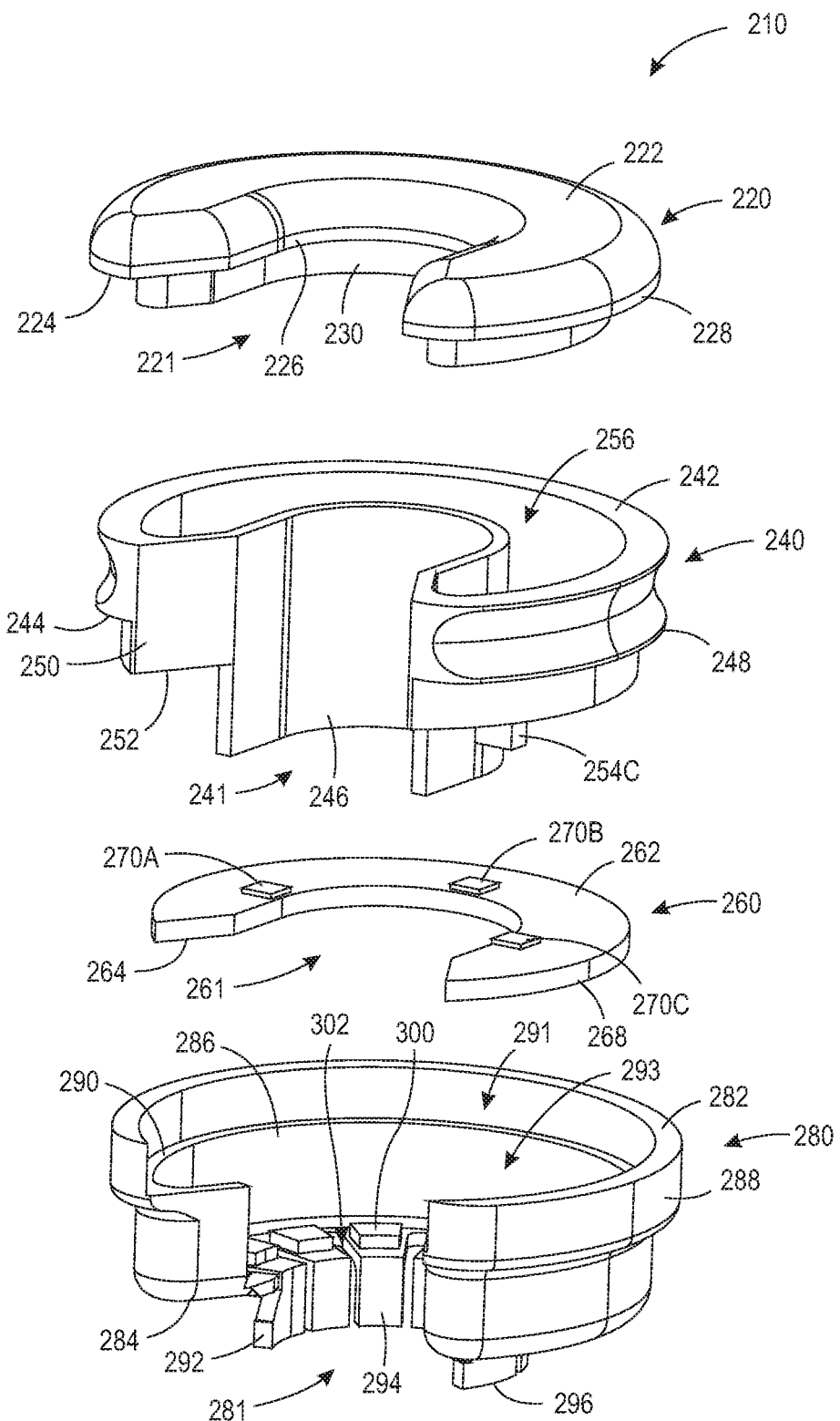
FIG. 12 is an exploded perspective view of the connection verifier shown in FIG. 11.

FIG. 11 is a perspective view of connection verifier 210. FIG. 12 is an exploded perspective view of connection verifier 210. Connection verifier 210 generally comprises cap 220, body 240, circuit or circuit board 260, boot 280, and opening 211. When connection verifier 210 is fully assembled, cap 220, body 240, circuit 260, and boot 280 are all non-rotatably connected. The following description should be read in view of FIGS. 11-12.

Cap 220 comprises top surface 222, bottom surface 224, radially inward facing surface 226, radially outward facing surface 228, and opening 221. Cap 220 is generally cylindrical; however, it should be appreciated that cap 220 may comprise any geometry suitable for mating with body 240, for example, square-, rectangular-, ovular-, ellipsoidal-, and triangular-shaped geometry. Cap 220 further comprises plug section 230 which is connected to and extends from bottom surface 224. Radially inward facing surface 226 is substantially concentric to radially outward facing surface 228. Radially inward facing surface 226 opens up forming opening 221 as shown. Plug section 230 is arranged to engage aperture 256 of body 240. In some embodiments, cap 220 is secured to body 240 via an interference or press fit between plug section 230 and aperture 256. In some embodiments, cap 220 is secured to body 240 via adhesives or another suitable method of connection, for example, rivets, screws, nails, bolts, etc. It should be appreciated that in some embodiments, cap 220 may not comprise plug section 230, and may be secured to top surface 242. When cap 220 is secured to body 240, bottom surface 224 abuts against or is arranged substantially proximate to top surface 242.

Figure 13:
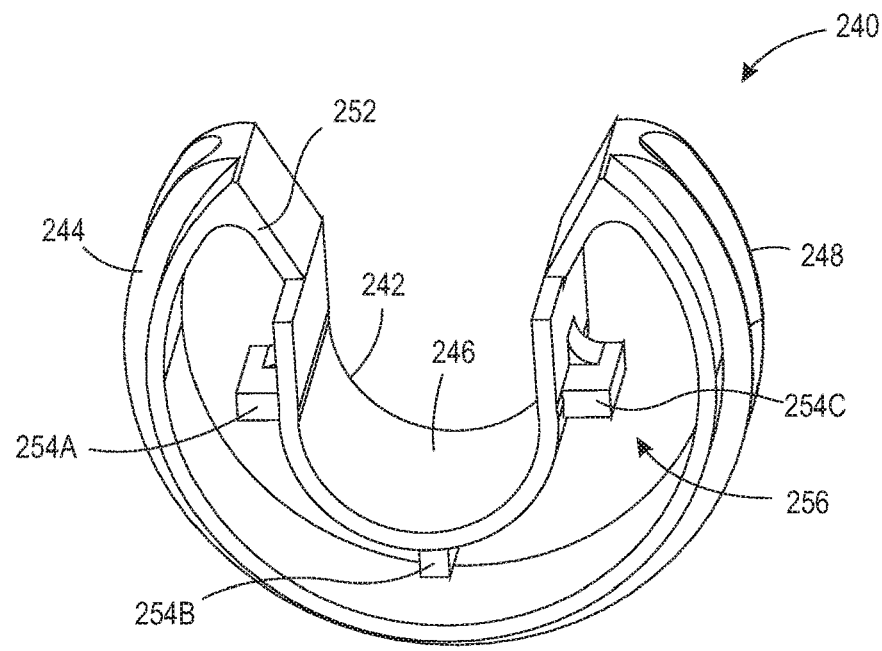
FIG. 13 is a bottom perspective view of the body shown in FIG. 11.

FIG. 13 is a bottom perspective view of body 240. The following descriptions should be read in view of FIGS. 11-13. Body 240 comprises top surface 242, bottom surface 244, radially inward facing surface 246, radially outward facing surface 248, and opening 241. Body 240 is generally cylindrical; however, it should be appreciated that body 240 may comprise any geometry suitable for mating with cap 220 and boot 280, for example, square-, rectangular-, ovular-, ellipsoidal-, and triangular-shaped geometry. Body 240 further comprises plug section 250 which is connected to and extends from bottom surface 244. Radially inward facing surface 246 is substantially concentric to radially outward facing surface 248. Radially inward facing surface 246 opens up forming opening 241 as shown. Plug section 250 is arranged to engage boot 280. Specifically, plug section 250 engages aperture 291 in boot 280 such that, when secured, bottom surface 252 abuts against or is arranged substantially proximate to surface 290. In some embodiments, body 240 is secured to boot 280 via an interference or press fit between plug section 250 and aperture 291. In some embodiments, body 240 is secured to boot 280 via adhesives or another suitable method of connection, for example, rivets, screws, nails, bolts, etc. It should be appreciated that in some embodiments, body 240 may not comprise plug section 250, and may be secured to top surface 282. When body 240 is secured to boot 280, bottom surface 244 abuts against or is arranged substantially proximate to top surface 282. Body 240 further comprises one or more vertical members arranged in aperture 256. In some embodiments, body 240 does not comprise plug section 250. In the embodiment shown, body 240 comprises three vertical members 254A-C. Vertical members 254A-C are circumferentially spaced such that they engage or extend to proximate sensors 270A-C arranged on top surface 262 of circuit 260, as will be discussed in greater detail below. In some embodiments, vertical member 254B is circumferentially spaced approximately 90 degrees from vertical member 254A, vertical member 254C is circumferentially spaced approximately 90 degrees from vertical member 254B, and vertical member 254A is circumferentially spaced approximately 180 degrees from vertical member 254C.

Figure 14A:
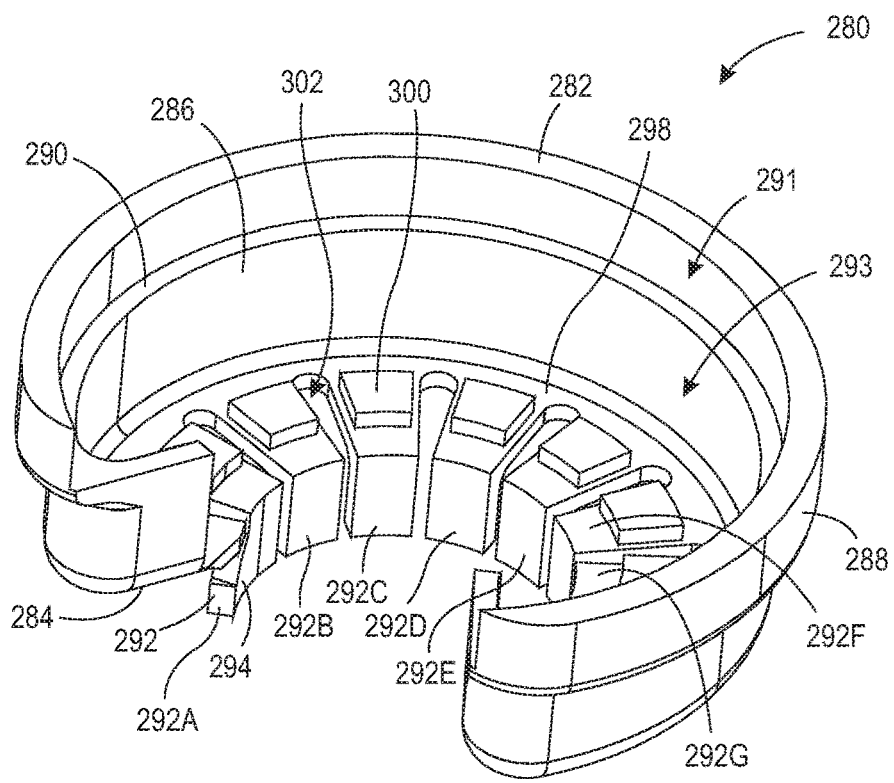
FIG. 14A is a front top perspective view of the boot shown in FIG. 11.
Figure 14B:
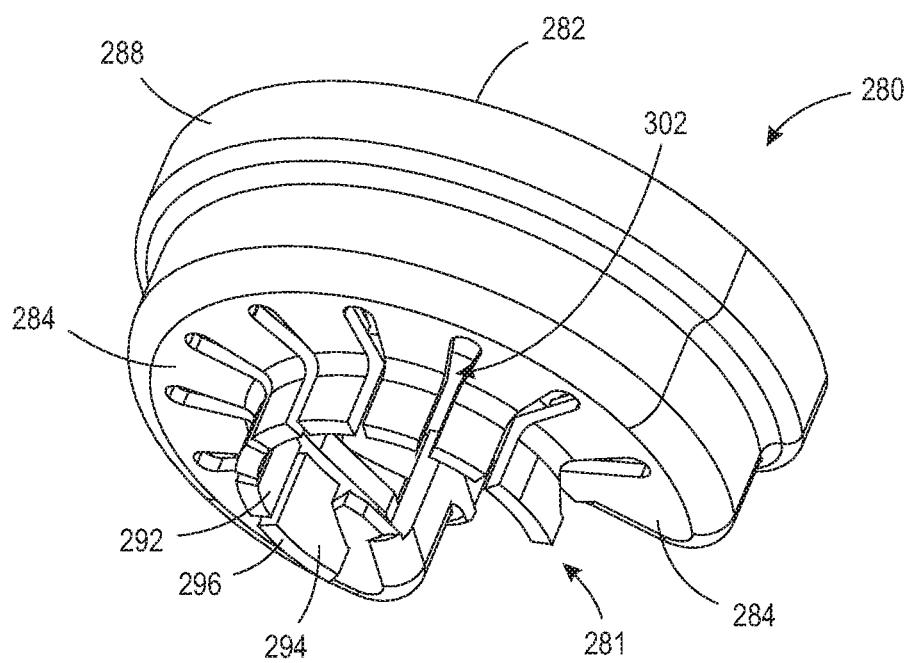
FIG. 14B is a rear bottom perspective view of the boot shown in FIG. 11.
Figure 14C:
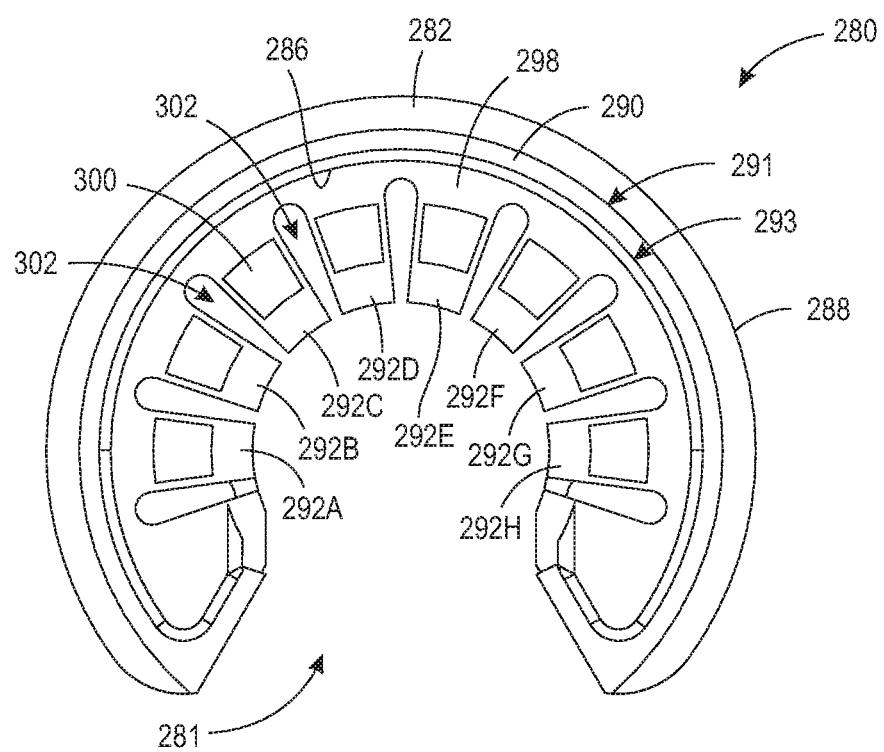
FIG. 14C is a top elevational view of the boot shown in FIG. 11.
Figure 14D:
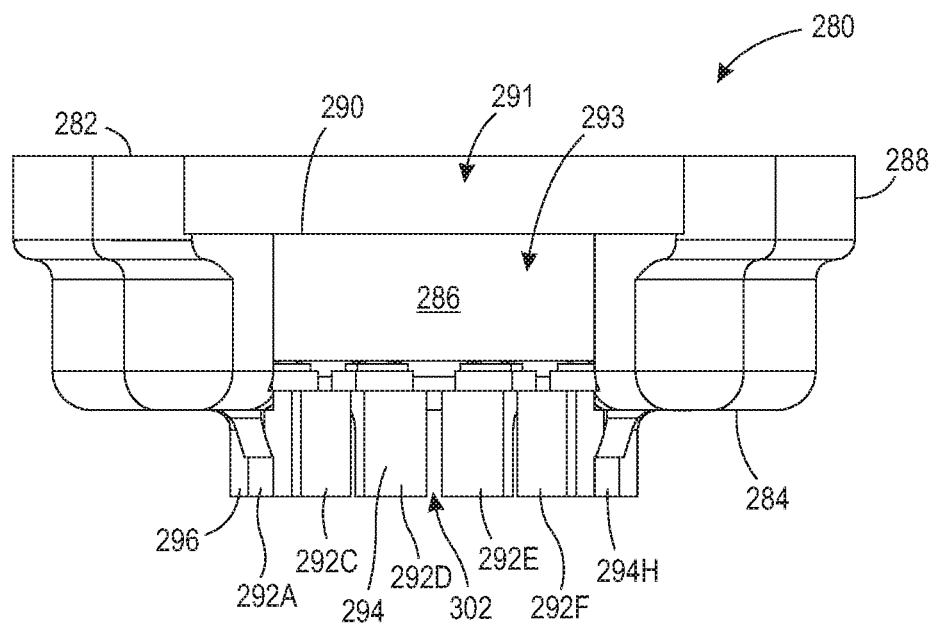
FIG. 14D is a front elevational view of the boot shown in FIG. 11.
Figure 14E:
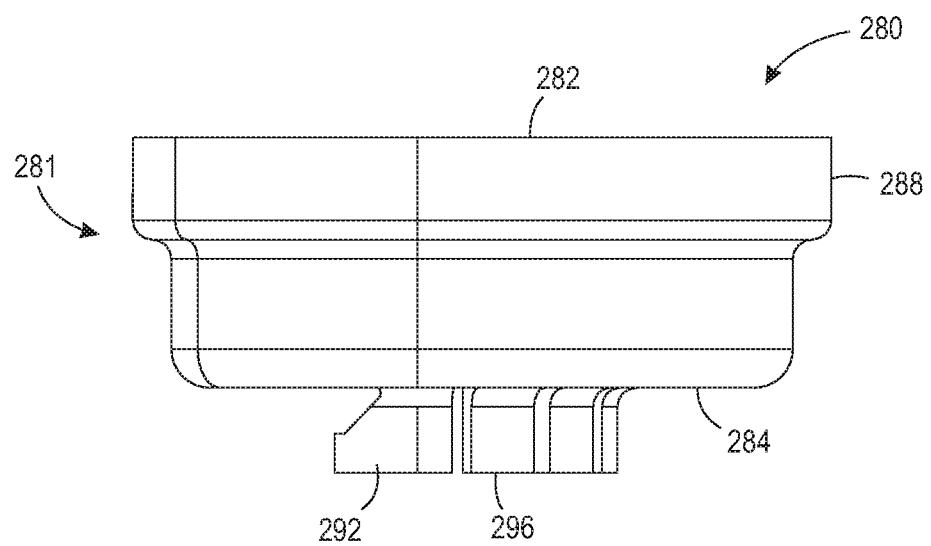
FIG. 14E is a right side elevational view of the boot shown in FIG. 11.

FIG. 14A is a front top perspective view of boot 280. FIG. 14B is a rear bottom perspective view of boot 280. FIG. 14C is a top elevational view of boot 280. FIG. 14D is a front elevational view of boot 280. FIG. 14E is a right side elevational view of boot 280. The following description should be read in view of FIGS. 11-14E. Boot 280 comprises top surface 282, bottom surface 284, radially inward facing surface 286, radially outward facing surface 288, and opening 281. Boot 280 is generally cylindrical; however, it should be appreciated that boot 280 may comprise any geometry suitable for mating with body 240 and circuit 260, for example, square-, rectangular-, ovular-, ellipsoidal-, and triangular-shaped geometry. Radially inward facing surface 286 is substantially concentric to radially outward facing surface 288. Boot 280 further comprises aperture 291 which extends from top surface 282 to surface 290, and aperture 293 which extends from surface 290 to surface 298. As previously discussed, aperture 291 is arranged to engage plug section 250 such that bottom surface 244 abuts against or is arranged substantially proximate top surface 282, and bottom surface 252 abuts against or is arranged substantially proximate surface 290. When body 240 and boot 280 are fully engaged, vertical members 254A-C extend down into aperture 293. Circuit 260 is arranged to fit within aperture 293. In some embodiments, circuit 260 is secured to boot 280 via an interference or press fit between radially outward facing surface 268 and aperture 293 (i.e., radially inward facing surface 286). In some embodiments, circuit 260 is secured in boot 280 via adhesives or another suitable method of connection, for example, rivets, screws, nails, bolts, etc. Boot 280 further comprises probe 292 connected to and extending from bottom surface 284. Probe 292 comprises radially inward facing surface 294 and engaging edge 296. Engaging edge 296 is arranged to engage a snap ring of a fluid connection to determine if the fluid connection is properly connected, as will be discussed in greater detail below. In the embodiment shown, probe 292 comprises one or more sections, specifically, sections 292A-H, which are separated from each other by one or more slits or spaces 302. By breaking probe 292 into sections 292A-H via slits 302, connection verifier 210 can better isolate the circumferential location of the snap ring protrusions since less force is applied on adjacent sensors. For example, if section 292C is arranged over protrusion 150B, only section 292C will deflect and trigger the sensor that is circumferentially aligned with section 292C, but not the sensors circumferentially aligned with sections 292B or 292D. In some embodiments, boot 280 is a singular molded compliant rubber element. In some embodiments, surface 298 further comprises one or more platforms 300. Platforms 300 are arranged between surface 298 and sensors 272. In some embodiments, there is one platform per section of probe 292, as shown in FIG. 14C.

In some embodiments, circuit 260 comprises a plurality of conductive pads in place of sensors 272A-H. In this embodiment, platforms 300 or surface 298 would contact the conductive pads directly and behave like individual switches. Boot 280 may comprise metal or a similar conductive material which would be electrically bonded to the system ground. The conductive input pads would be monitored by a microcontroller and pulled up. When surface 298 or platforms 300 contact the conductive input pads, they create a short to ground which would pull the inputs low, which the microcontroller would detect (edge triggered event).

In some embodiments, circuit 260 is flexible and arranged on surface 298. In this embodiment, one or more sensors arranged on circuit 260 detect deflection of boot 280, or more specifically, sections 292A-H. When the deflection of probe 292 in a circumferential location is equal to a predetermined distance, it is determined that a protrusion of the snap ring is present.

Figure 15:
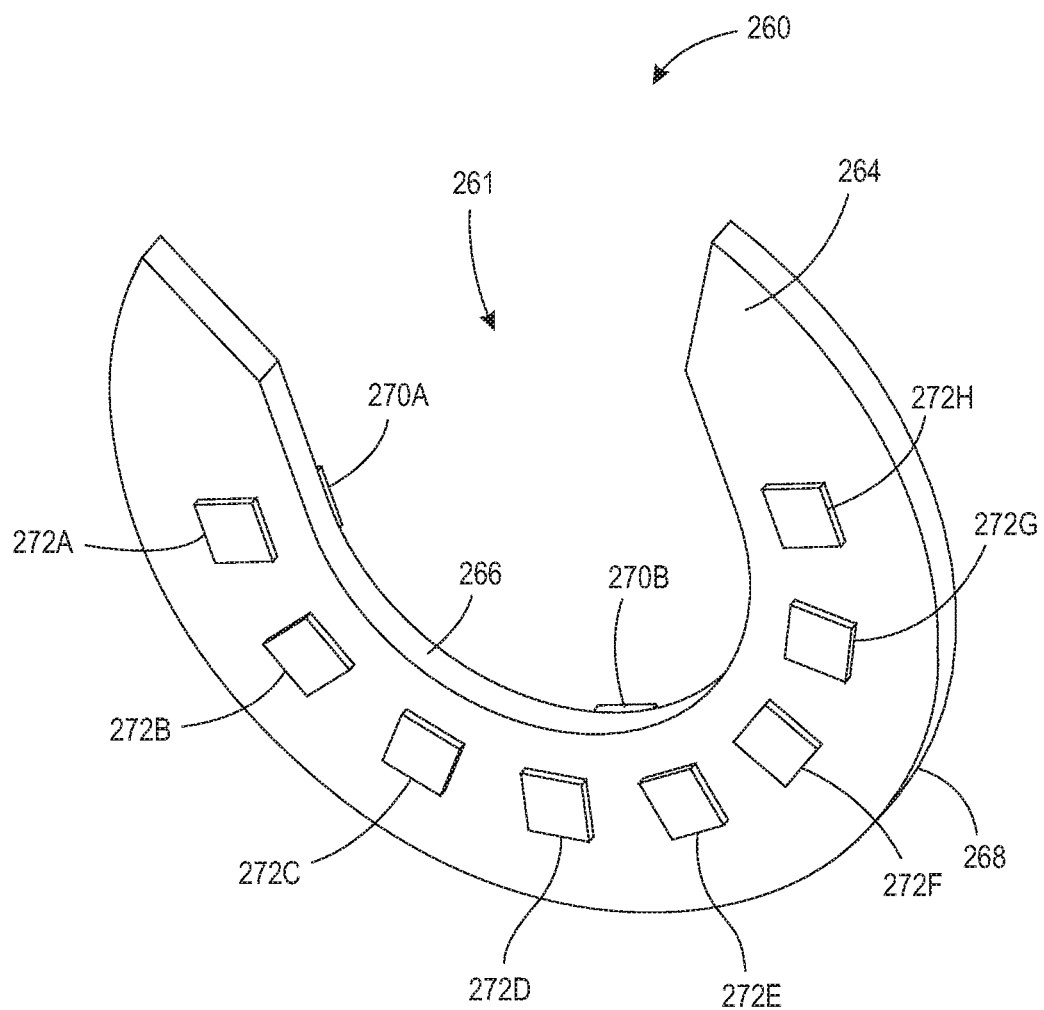
FIG. 15 is a bottom perspective view of the circuit shown in FIG. 12.

FIG. 15 is a bottom perspective view of circuit 260. The following description should be read in view of FIGS. 11-15.

In some embodiments, circuit 260 comprises a circuit board (e.g., a printed circuit board). Circuit 260 comprises top surface 262, bottom surface 264, radially inward facing surface 266, radially outward facing surface 268, and opening 261. Circuit 260 is generally disc-shaped or cylindrical; however, it should be appreciated that circuit 260 may comprise any geometry suitable for arrangement within boot 280, for example, square-, rectangular-, ovular-, ellipsoidal-, and triangular-shaped geometry. Radially inward facing surface 266 is substantially concentric to radially outward facing surface 268. Radially inward facing surface 266 opens up forming opening 261 as shown. As previously discussed, circuit 260 is arranged in boot 280, specifically aperture 293, such that bottom surface 264 abuts against or is arranged substantially proximate to surface 298. In some embodiments, circuit 260 is secured to boot 280 via an interference or press fit between radially outward facing surface 268 and aperture 293. In some embodiments, circuit 260 is secured in boot 280 via adhesives or another suitable method of connection, for example, rivets, screws, nails, bolts, etc. In some embodiments, circuit 260 is a printed circuit. Circuit 260 further comprises one or more sensors arranged on top surface 262. In the embodiment shown, circuit 260 comprises three sensors 270A-C arranged on top surface 262. Sensors 270A-C are differential/trigger sensors operatively arranged to interface with body 240, specifically vertical members 254A-C, respectively, to trigger test initiation (once the user has applied enough force to meet a predetermined threshold) and provide a differential reference force that may be used to compensate for uneven pressure by the user (i.e., sensors 270A-C determine if the user is applying an even pressure to connection verifier 210). Sensors 270A-C are circumferentially spaced about top surface 262 such that they are aligned with vertical members 254A-C, respectively. In some embodiments, sensor 270B is circumferentially spaced approximately 90 degrees from sensor 270A, sensor 270C is circumferentially spaced approximately 90 degrees from sensor 270B, and sensor 270A is circumferentially spaced approximately 180 degrees from sensor 270C. Circuit 260 further comprises one or more sensors 272 arranged on bottom surface 264. Sensors 272 are input sensors (an input sensor array) operatively arranged to detect forces applied to probe 292 so as to determine the presence of protrusion of a snap ring (i.e., if two protrusions are detected, then the fluid connection is properly connected). In the embodiment shown, circuit comprises sensors 272A-L circumferentially spaced about bottom surface 264. Sensors 272A-L will detect the same amount of force relative to each other when probe 292 is compressed against a flat surface, for example the tube end form shoulder surface, thus indicating that no protrusions are present (i.e., snapped behind the shoulder of the tube end form) and that the fluid connection is not properly connected. Vertical members 254A-C extend down through aperture 293 and terminate at sensors 70A-C, respectively. When a force is applied to top surface 222, the compression that occurs between vertical members 254A-C and sensors 270A-C provide a base variable that allows the user to determine how much pressure has been applied. This base variable should be equal to or exceed a predetermined threshold. In some embodiments, sensors 270A-C and 272 comprise NextInput, Inc. ForceTouch™ Sensors or NextInput, Inc. ForceGauge™ Sensors. It should be appreciated, however, that sensors 270A-C and 272 may comprise any sensors suitable for obtaining force input from probe 292 and user applied pressure, respectively.

Circuit 260 is any suitable circuit that indicates when sensors 272 detect a suitable force at one or more (e.g., two) circumferential locations, thereby indicating a secure (or unsecure) fluid connection. In some embodiments, circuit 260 comprises an indicator device, such as an indicator light, to activate when sensors 272 detect a suitable force at one or more (e.g., two) circumferential locations, thereby indicating a secure connection. In some embodiments, circuit 260 comprises a vibration device (e.g., vibration motor) such that when sensors 272 detect a suitable force at one or more (e.g., two) circumferential locations, the vibration device vibrates connection verifier 210 to indicate a secure connection. For example, the vibration device may be a Haptic device which can take the form of a motor with an eccentric cam that vibrates or a piezo device that vibrates in response to an applied waveform. The piezo device can also produce an audible output. In some embodiments, circuit 260 comprises a sound device (e.g., a speaker and any other necessary sound equipment) such that when sensors 272 detect a suitable force at one or more (e.g., two) circumferential locations, the speaker outputs a noise to indicate a secure connection. Circuit 260 may further comprise a microcontroller which contains one or more central processing units (CPUs) along with memory and programmable input output peripherals. As is discussed in greater detail below, the microcontroller may be used to: activate the indicator light (or other indicator device) upon verification of a secure connection, initiate, using a transmission device, the transmission of a signal to a receiver at a remote location indicating a secure connection (or an unsecure connection), and activate a tool failure indicator.

Connection verifier 210 further comprises a transmission device that is electrically connected to circuit 260 and optionally a memory device or a microcontroller. The transmission device is arranged to transmit a signal to a remote location indicating that a fluid connection is secure, or unsecure. In some embodiments, the transmission device is arranged to send a signal via an electrical cable such as a wire or a fiber optic cable (i.e., a physical form of connection). The transmission device may use inter-integrated circuit ($I^2C$), controller area network (CAN), local interconnect network (LIN), or any suitable communication protocol known in the art. In some embodiments, the transmission device is arranged to send a wireless communication to a receiver at a remote location which records the data sent (i.e., whether the fluid connection is securely connected, or not). The transmission device may transmit the data using any suitable method known in the art, for example, Bluetooth® communication, radio frequency, infrared, and Wi-Fi® communication. In some embodiments, the transmission device may transmit the fluid connection identification number, the connection verifier identification number, the remaining life of the connection verifier, the vehicle identification number (VIN), the part number (e.g., engine, radiator, etc.) and serial number for that part, verification that a fluid connection is secure, and/or verification that a fluid connection is not secure. In some embodiments, connection verifier can operate in conjunction with another device, such as a computer, to allow an electronic record to be kept of each inspection, and print a pass/fail label.

Connection verifier 210 may further comprise a tool failure indicator, such as a light, a vibration device, or a sound device, to indicate that connection verifier 210 should be replaced. In this embodiment, connection verifier 210 could, for example, include a memory device or a microcontroller that is programed with a predefined number, such that when connection verifier 210 is used a number of times equal to that predefined number, the tool failure indicator activates (i.e., the light turns on, the vibration device vibrates, the sound device creates a sound). The microcontroller may also tally the number of times connection verifier 210 is used, and using a preset remaining life calculation with a safety factor, continuously determine the remaining life of connection verifier.

Similar to the procedure discussed above with respect to connection verifier 10, to verify that fluid connection 160 is securely connected, connection verifier 210 is first arranged around tube end form 120 through opening 211. Fluid connector 210 is then slid down tube end form 120 in axial direction AD1 until in the engaged position. Fluid connector 210 is slid down tube end form 120 in axial direction AD1 until probe 292, specifically engaging edge 296, contacts snap ring 150 or shoulder surface 128. The user applies a force to top surface 222 or connection verifier 210 that is equal to or greater than a predetermined threshold, as determined by sensors 270A-C. If leading edge 296 is in contact with one or more protrusions, the user applied force creates a force on probe 292 (i.e., one or more of sections 292A-H) which is detected by one or more sensors 272 that are arranged at the circumferential position of the one or more protrusions. The sensor that detects the force of the protrusion on probe 292 will read at a higher level of force than the adjacent or other sensors, which indicates that a protrusion exists and that protrusion has properly "snapped" over shoulder 127. In some embodiments, if sensors 270 detect that at least two protrusions have properly "snapped" over shoulder 127, then it is determined that fluid connection 160 is properly connected.

Specifically, probe 292 is slid between radially outward facing surface 130 and radially inward facing surface 144 to engage one or more of protrusions 150A-C of snap ring 150.

If snap ring 150 is not arranged on fluid connector 140, then engaging edge 296 would continue down to shoulder surface 128. The user applied force would, in this instance, create a force on probe 292; however, the force on probe 292 would be equally distributed about leading edge 296. As such, sensors 272A-L would all read at the same level of force, which indicates that no protrusion is present and that snap ring 150 is either not connected or not connected properly to fluid connection 160. Sensors 272 detect the pressure gradient or change in force along the circumference of probe 292, and circuit 260 and/or microcontroller and/or computer determine, based on the pressure gradient, whether there is a presence of one or more protrusions and if so, if tube end form 120 is properly connected to fluid connector 140.

Figure 16A:
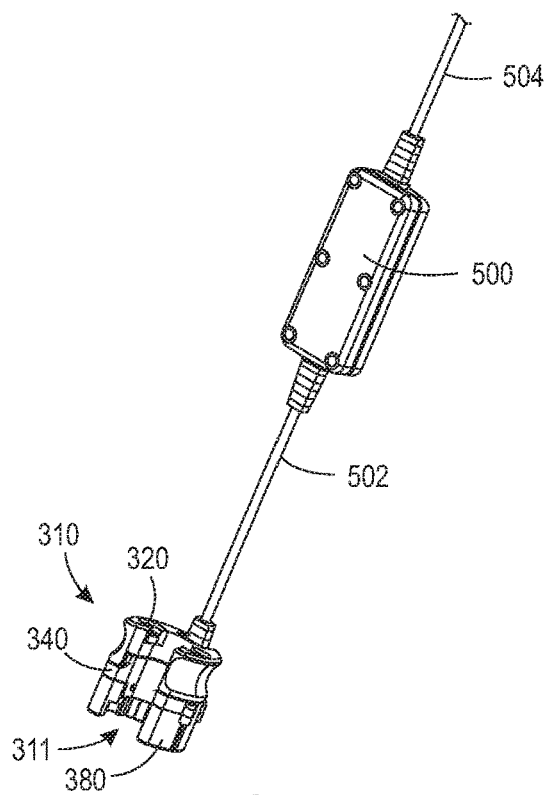
FIG. 16A is a front perspective view of a connection verifier connected to a haptic.
Figure 16B:
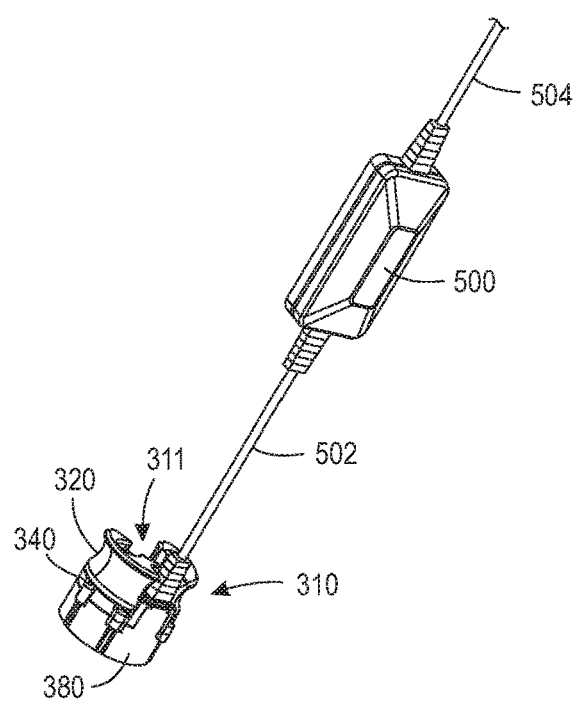
FIG. 16B is a rear perspective view of the connection verifier and haptic shown in FIG. 16A.
Figure 17A:
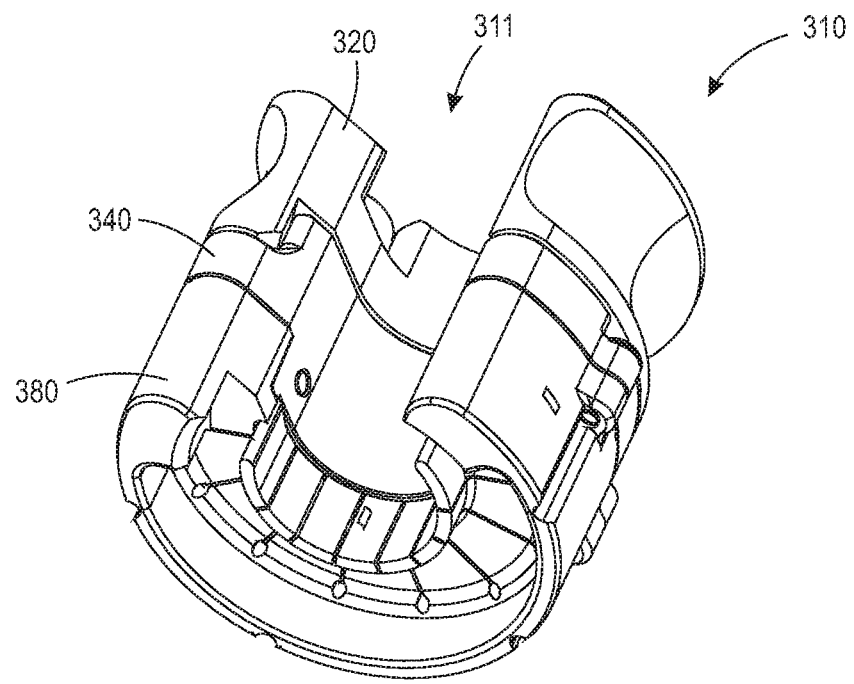
FIG. 17A is a bottom perspective view of the connection verifier shown in FIG. 16A.
Figure 17B:
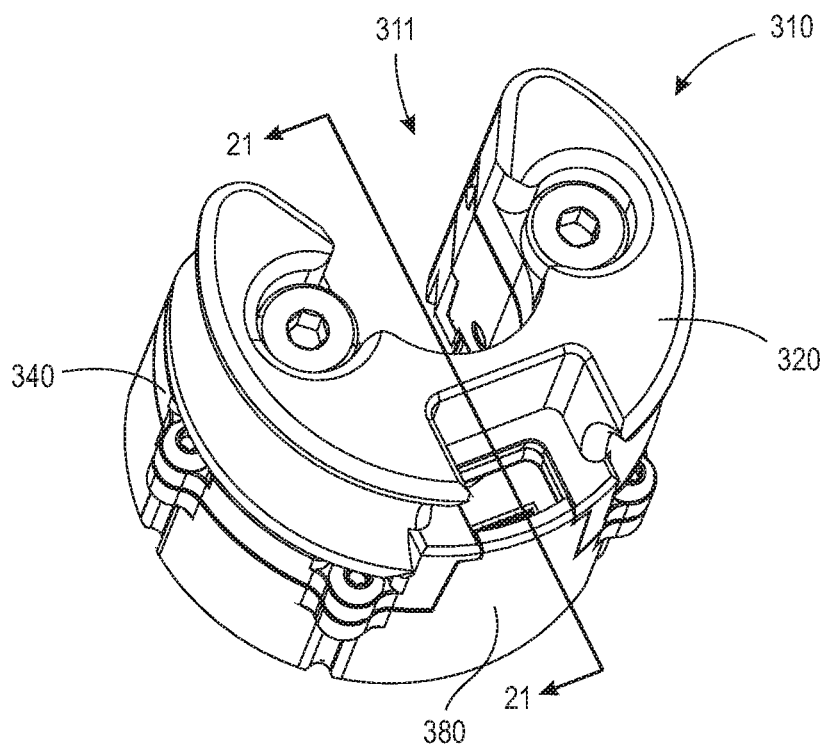
FIG. 17B is a top perspective view of the connection verifier shown in FIG. 16A.
Figure 18A:
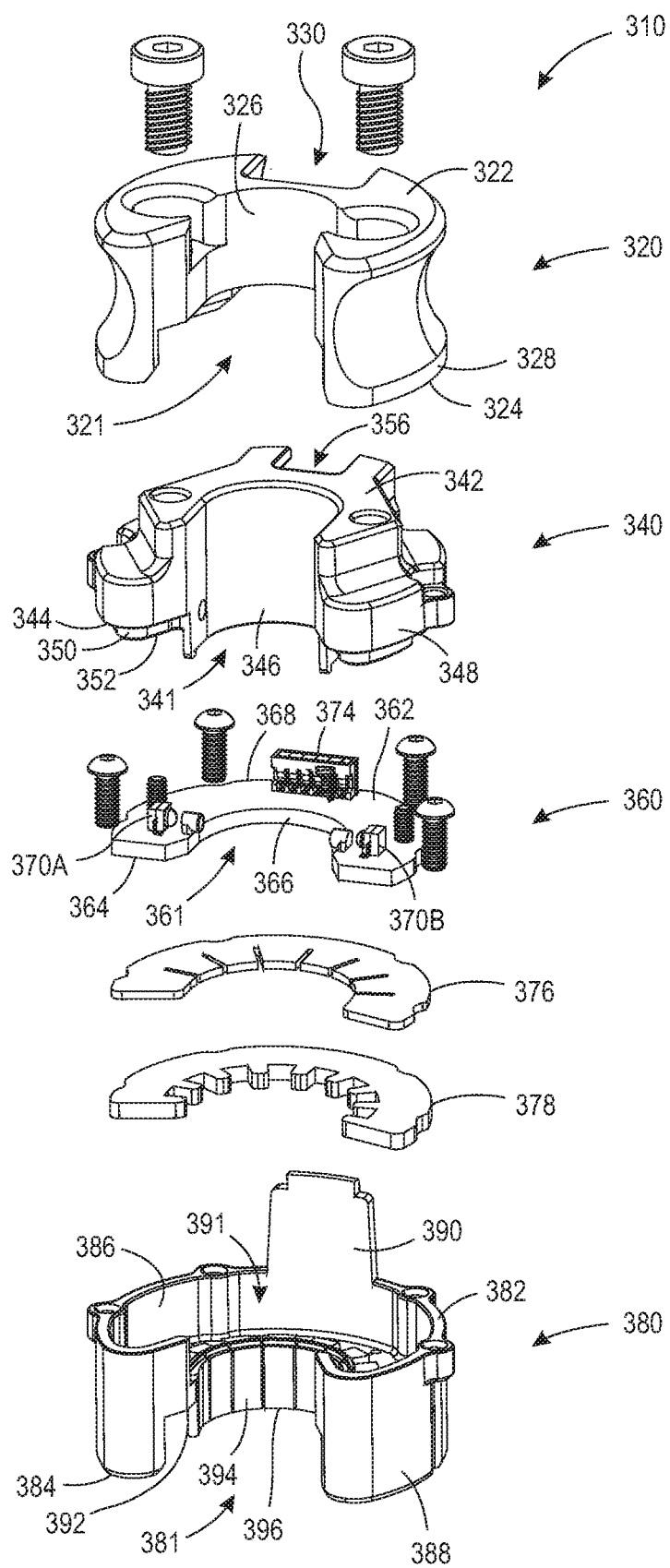
FIG. 18A is top exploded perspective view of the connection verifier shown in FIG. 16A.
Figure 18B:
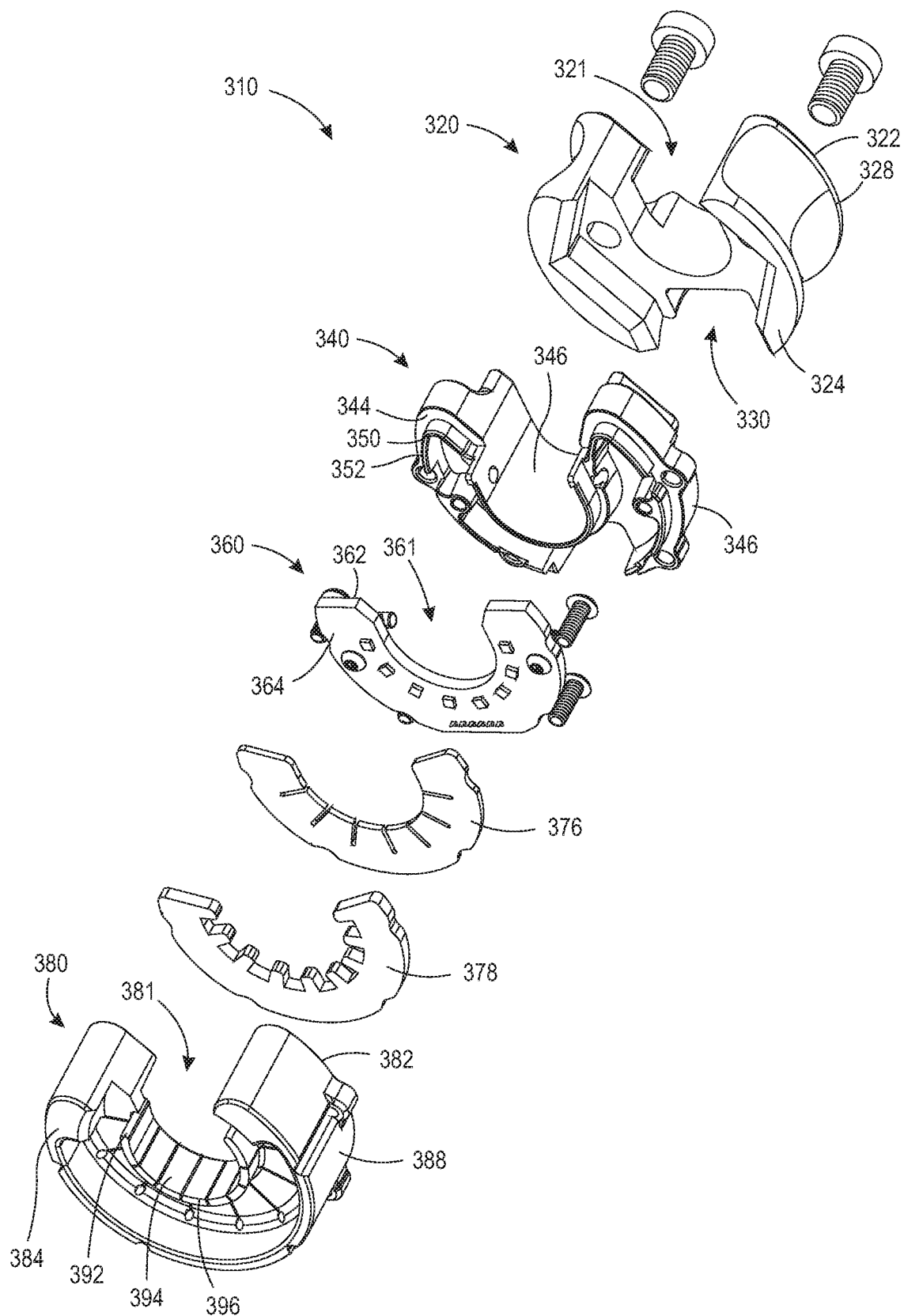
FIG. 18B is a bottom exploded perspective view of the connection verifier shown in FIG. 16A.

FIG. 16A is a front perspective view of connection verifier 310 connected to haptic 500. FIG. 16B is a rear perspective view of connection verifier 310 and haptic 500. FIG. 17A is a bottom perspective view of connection verifier 310. FIG. 17B is a top perspective view of connection verifier 310. FIG. 18A is top exploded perspective view of connection verifier 310. FIG. 18B is a bottom exploded perspective view of connection verifier 310. Connection verifier 310 generally comprises cap 320, body 340, circuit or circuit board 360, boot 380, and opening 311. When connection verifier 310 is fully assembled, cap 320, body 340, circuit 360, and boot 380 are all non-rotatably connected. The following description should be read in view of FIGS. 16A-18B.

Cap 320 comprises top surface 322, bottom surface 324, radially inward facing surface 326, radially outward facing surface 328, and opening 321. Cap 320 is generally cylindrical; however, it should be appreciated that cap 320 may comprise any geometry suitable for mating with body 340, for example, square-, rectangular-, ovular-, ellipsoidal-, and triangular-shaped geometry. Radially inward facing surface 326 is substantially concentric to radially outward facing surface 328. Radially inward facing surface 326 opens up forming opening 321 as shown. In some embodiments, cap 330 is secured to body 340 via one or more bolts. In some embodiments, cap 320 is secured to body 340 via an interference or press fit between the components. In some embodiments, cap 320 is secured to body 340 via adhesives or another suitable method of connection, for example, rivets, screws, nails, bolts, etc. Cap 320 further comprises aperture 330, which is operatively arranged to allow wire 502 to pass through and connect to port 374, as will be discussed in greater detail below.

Body 340 comprises top surface 342, bottom surface 344, radially inward facing surface 346, radially outward facing surface 348, and opening 341. Body 340 is generally cylindrical; however, it should be appreciated that body 340 may comprise any geometry suitable for mating with cap 320 and boot 380, for example, square-, rectangular-, ovular-, ellipsoidal-, and triangular-shaped geometry. Body 340 further comprises plug section 350 which is connected to and extends from bottom surface 344. Radially inward facing surface 346 is substantially concentric to radially outward facing surface 348. Radially inward facing surface 346 opens up forming opening 341 as shown. Plug section 350 is arranged to engage boot 380. Specifically, plug section 350 engages aperture 391 in boot 380. In some embodiments, body 340 is secured to boot 380 via an interference or press fit between plug section 350 and aperture 391. In some embodiments, body 340 is secured to boot 380 via adhesives or another suitable method of connection, for example, rivets, screws, nails, bolts, etc. It should be appreciated that in some embodiments, body 340 may not comprise plug section 350, and may be secured to top surface 382. When body 340 is secured to boot 380, bottom surface 344 abuts against or is arranged substantially proximate to top surface 382.

Figure 19A:
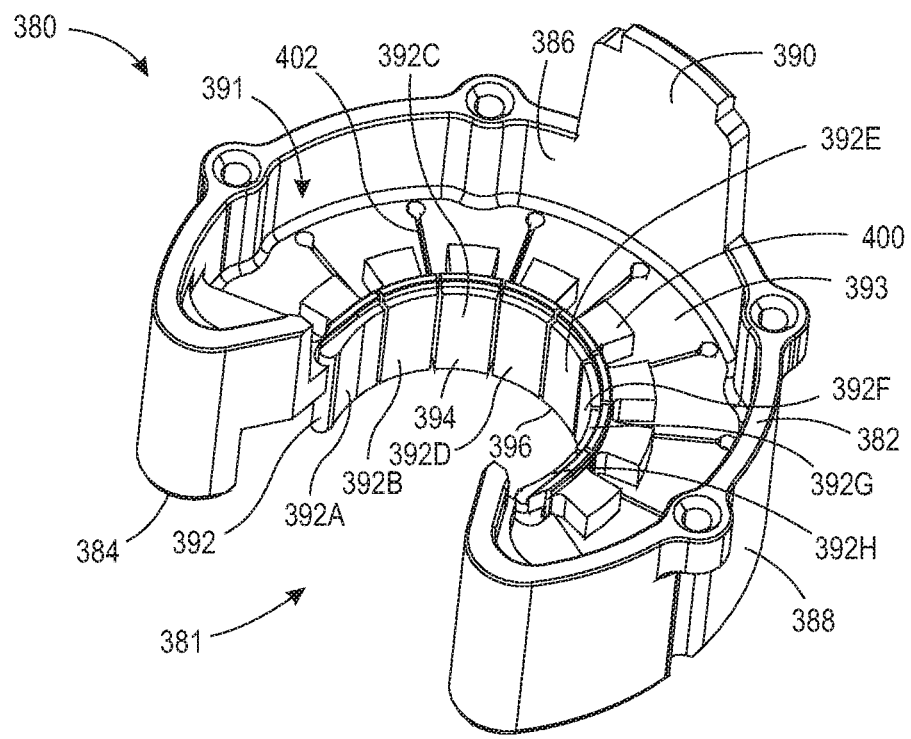
FIG. 19A is a top perspective view of the boot shown in FIG. 16A.
Figure 19B:
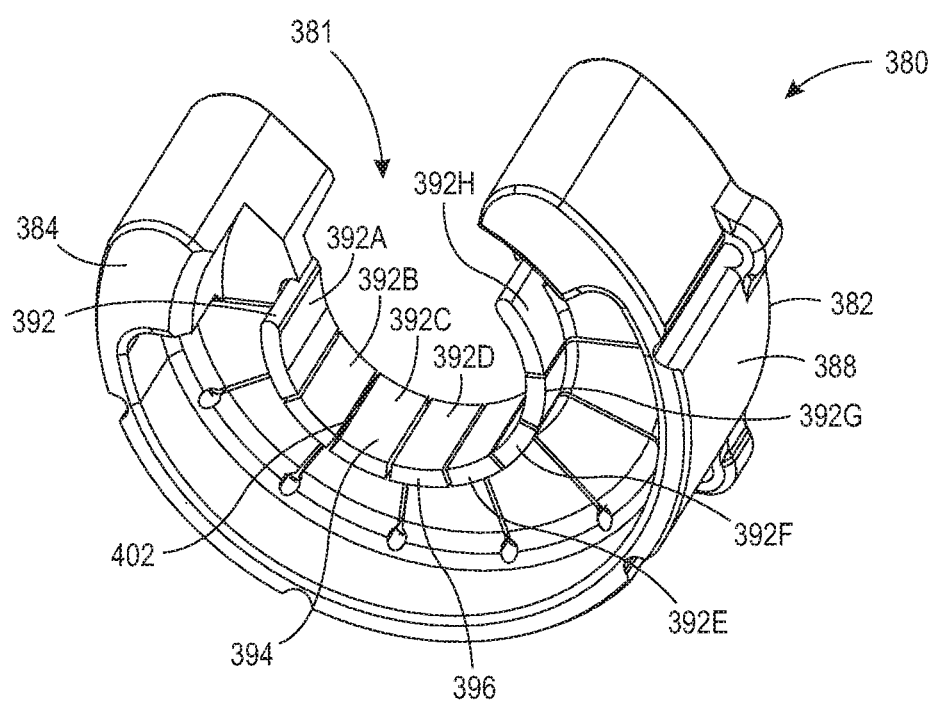
FIG. 19B is a bottom perspective view of the boot shown in FIG. 16A.

FIG. 19A is a top perspective view of boot 380. FIG. 19B is a bottom perspective view of boot 380. The following description should be read in view of FIGS. 16A-19B. Boot 380 comprises top surface 382, bottom surface 384, radially inward facing surface 386, radially outward facing surface 388, and opening 381. Boot 380 is generally cylindrical; however, it should be appreciated that boot 380 may comprise any geometry suitable for mating with body 340 and circuit 360, for example, square-, rectangular-, ovular-, ellipsoidal-, and triangular-shaped geometry. Radially inward facing surface 386 is substantially concentric to radially outward facing surface 388. Boot 380 further comprises aperture 391 which extends from top surface 382 to surface 393. As previously discussed, aperture 391 is arranged to engage plug section 350 such that bottom surface 344 abuts against or is arranged substantially proximate top surface 382, and bottom surface 352 abuts against or is arranged substantially proximate surface 393. Circuit 360 is arranged to fit within aperture 391. In some embodiments, circuit 360 is secured to boot 380 via an interference or press fit between radially outward facing surface 368 and aperture 391 (i.e., radially inward facing surface 386). In some embodiments, circuit 360 is secured in boot 380 via adhesives or another suitable method of connection, for example, rivets, screws, nails, bolts, etc. Boot 380 further comprises probe 392 connected to and extending from surface 393. Probe 392 comprises radially inward facing surface 394 and engaging edge 396. Engaging edge 396 is arranged to engage a snap ring of a fluid connection to determine if the fluid connection is properly connected, as previously described with respect to FIGS. 7-10. In the embodiment shown, probe 392 comprises one or more sections, specifically, sections 392A-H, which are separated from each other by one or more slits 402. In some embodiments, probe 392 may be a separate component formed independent from boot 380. By breaking probe 392 into sections 392A-H via slits 402, connection verifier 310 can better isolate the circumferential location of the snap ring protrusions since less force is applied on adjacent sensors. For example, if section 392C is arranged over protrusion 150B, only section 392C will deflect and trigger the sensor that is circumferentially aligned with section 392C, but not the sensors circumferentially aligned with sections 392B or 392D. In some embodiments, boot 380 may comprise a single component or may be formed of multiple components. In some embodiments, boot 380 may comprise a metal or similar conductive material. In some embodiments, surface 398 further comprises one or more platforms 400. Platforms 400 are arranged between surface 393 and sensors 372 of circuit 360. In some embodiments, there is one platform per section of probe 392, as shown in FIG. 19A. In some embodiments, boot 380 further comprises protrusion 390, which extends from top surface 382. Protrusion 390 works in conjunction with aperture 356 of body 340 and aperture 330 of cap 320 to form a passageway to allow wire 502 to connect with port 374.

In some embodiments, connection verifier 310 further comprises preload element 376. Preload element 376 is operatively arranged between surface 393 of boot 380 and bottom surface 364 of circuit 360 to apply a preload to sensors 372. In this embodiment, the preload applied to sensors 372 by preload element 376 ensures that sensors 372 are always active. Any change in load upon any of sensors 372 indicates the presence of a snap ring protrusion. In some embodiments, preload element 376 comprises silicon rubber. In some embodiments, connection verifier 310 further comprises spacer 378 operatively arranged between preload element 376 and surface 393 of boot 380. In such embodiments, spacer 378 works in conjunction with preload element 376 to apply a preload to sensors 372.

In some embodiments, circuit 360 comprises a plurality of conductive pads in place of sensors 372A-H. In this embodiment, platforms 400 or surface 393 would contact the conductive pads directly and behave like individual switches. Boot 380 may comprise metal or a similar conductive material which would be electrically bonded to the system ground. The conductive input pads would be monitored by a microcontroller and pulled up. When surface 393 or platforms 400 contact the conductive input pads, they create a short to ground which would pull the inputs low, which the microcontroller would detect (edge triggered event).

In some embodiments, circuit 360 is flexible and arranged on surface 393. In this embodiment, one or more sensors arranged on circuit 360 detect deflection of boot 380, or more specifically, sections 392A-H. When the deflection of probe 392 in a circumferential location is equal to a predetermined distance, it is determined that a protrusion of the snap ring is present.

Figure 20A:
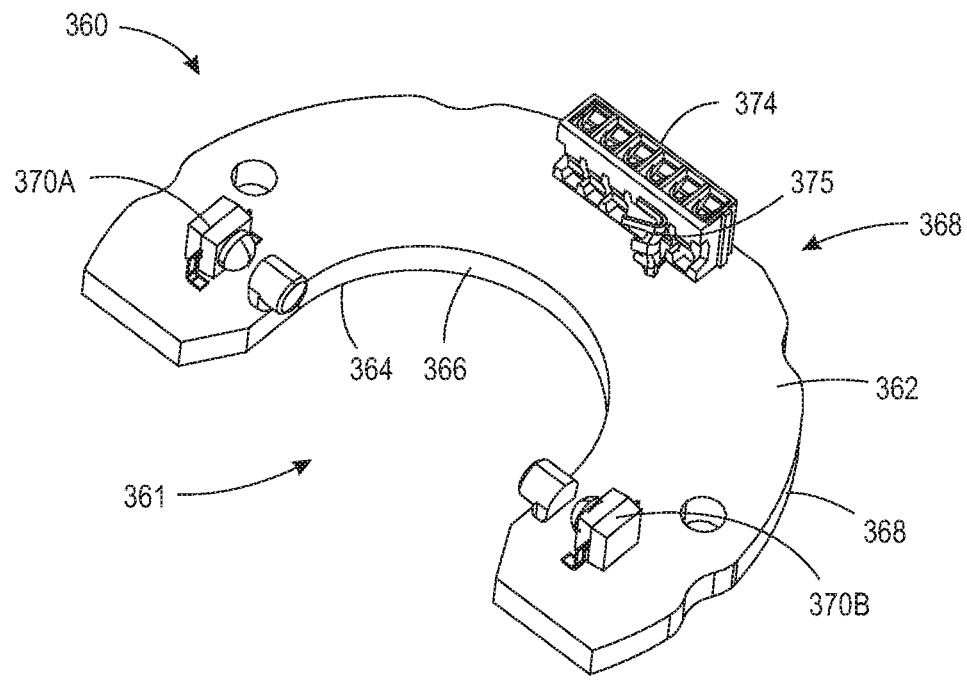
FIG. 20A is a top perspective view of the circuit shown in FIG. 18A.
Figure 20B:
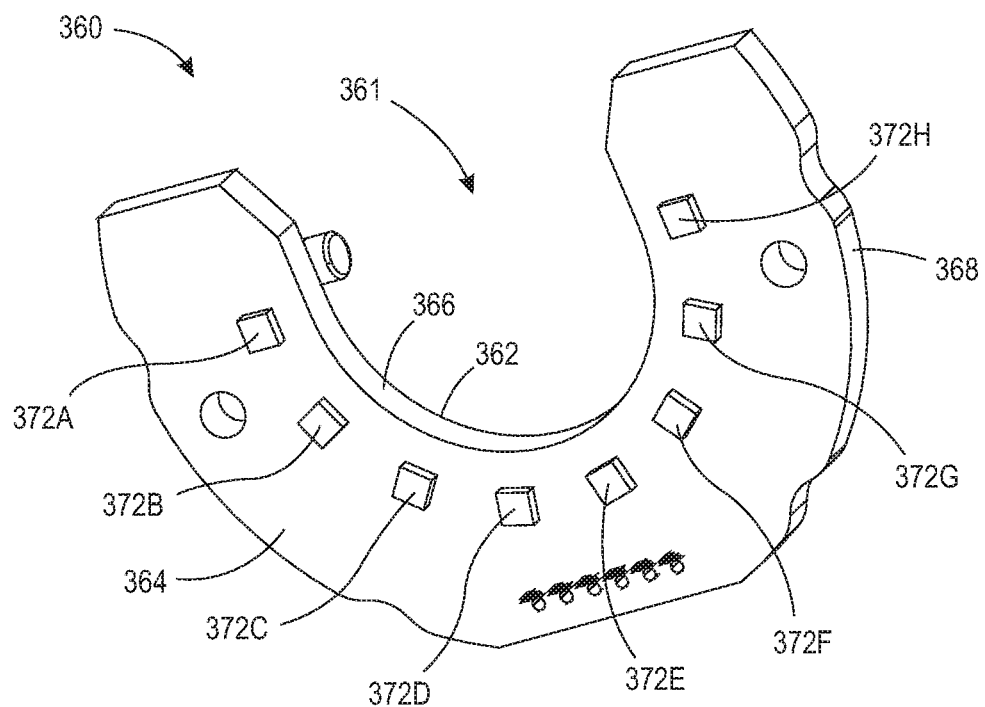
FIG. 20B is a bottom perspective view of the circuit shown in FIG. 18B.
Figure 21:
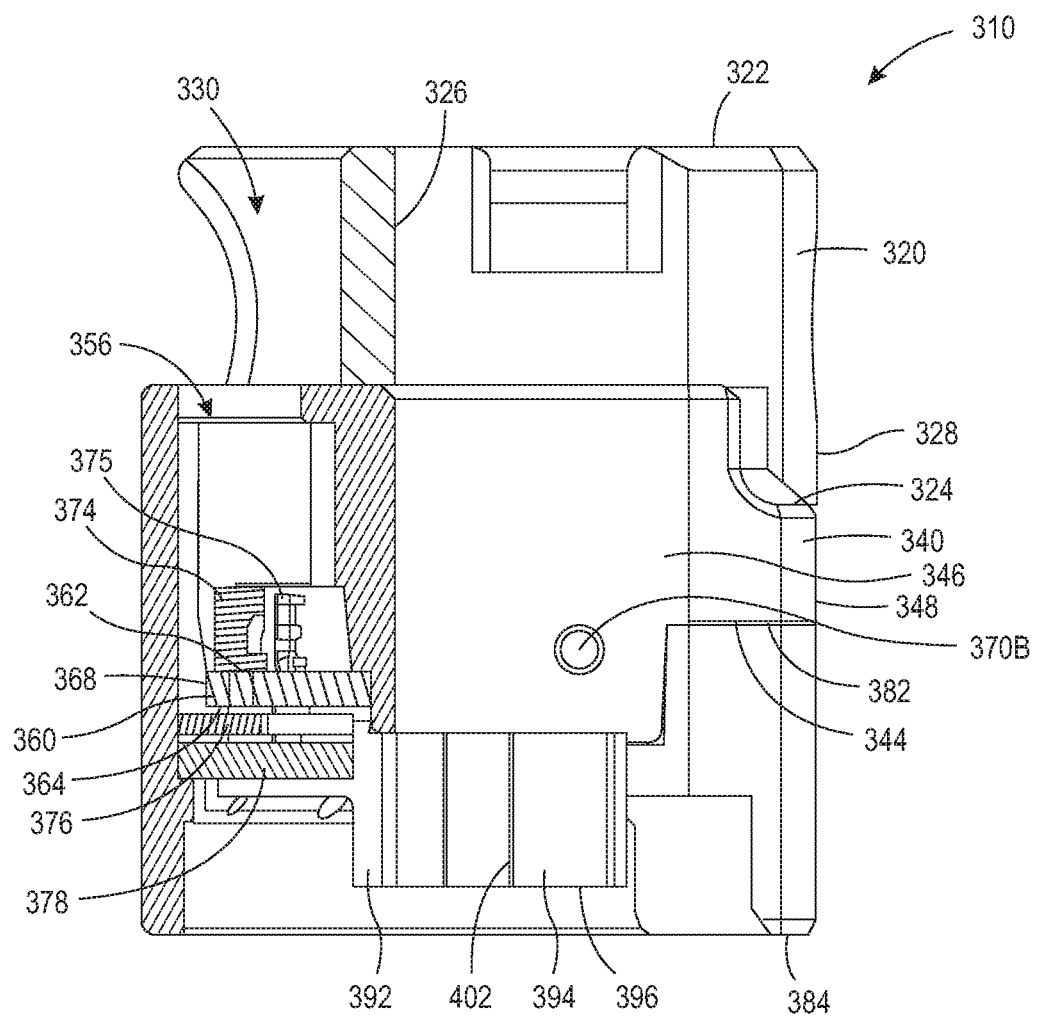
FIG. 21 is a cross-sectional view of the connection verifier taken generally along line 21-21 in FIG. 17B.

FIG. 20A is a top perspective view of circuit 360. FIG. 20B is a bottom perspective view of circuit 360. FIG. 21 is a cross-sectional view of connection verifier 310 taken generally along line 21-21 in FIG. 17B. The following description should be read in view of FIGS. 16A-21.

In some embodiments, circuit 360 comprises a circuit board (e.g., a printed circuit board). Circuit 360 comprises top surface 362, bottom surface 364, radially inward facing surface 366, radially outward facing surface 368, and opening 361. Circuit 360 is generally disc-shaped or cylindrical; however, it should be appreciated that circuit 360 may comprise any geometry suitable for arrangement within boot 380 and/or securement to body 340, for example, square-, rectangular-, ovular-, ellipsoidal-, and triangular-shaped geometry. In some embodiments, circuit 360 is secured to body 340, via any suitable means, such as, for example, screws, bolts, rivets, adhesives, etc. Radially inward facing surface 366 is substantially concentric to radially outward facing surface 368. Radially inward facing surface 366 opens up forming opening 361 as shown. As previously discussed, circuit 360 is arranged in boot 380, specifically in aperture 391, such that bottom surface 364 abuts against or is arranged substantially proximate to surface 393. In some embodiments, circuit 360 is secured to boot 380 via an interference or press fit between radially outward facing surface 368 and aperture 393, specifically radially inward facing surface 386. In some embodiments, circuit 360 is secured in boot 380 via adhesives or another suitable method of connection, for example, rivets, screws, nails, bolts, etc. In some embodiments, circuit 360 is a printed circuit. Circuit 360 comprises one or more sensors 372 arranged on bottom surface 364. Sensors 372 are input sensors (an input sensor array) operatively arranged to detect forces applied to probe 392 so as to determine the presence of protrusions of a snap ring (i.e., if two protrusions are detected, then the fluid connection is properly connected). In the embodiment shown, circuit comprises sensors 372A-H circumferentially spaced about bottom surface 364. Sensors 372A-H will detect the same amount of force relative to each other when probe 392 is compressed against a flat surface, for example the tube end form shoulder surface, thus indicating that no protrusions are present (i.e., snapped behind the shoulder of the tube end form) and that the fluid connection is not properly connected. As previously discussed, a preload is applied to sensors 372A-H by preload element 376. When additional force is applied to one or more sensors 372A-H in relation to the other sensors, the presence of a protrusion is verified. For example, if sensor 372A and sensor 372E incurs a higher load than sensors 372B-D and sensors 372F-H, then two protrusions are present and haptic 500 indicates that the fluid connection is properly connected. In some embodiments, sensors 372 comprise NextInput, Inc. FORCETOUCH™ Sensors or NextInput, Inc. FORCEGUAGE™ Sensors. It should be appreciated, however, that sensors 372 may comprise any sensors suitable for obtaining force input from probe 392.

In some embodiments, circuit 360 further comprises an optical sensor. For example, circuit 360 comprises optical transmitter 370A and optical receiver 370B. Optical transmitter 370A generates an optical signal and encodes the information to be transmitted on the light that it generates. Optical transmitter 370A propagates the optical signal (or beam of light) at optical receiver 370B (e.g., a free space optical system). Optical transmitter 370A and receiver 370B act as an additional fail safe, namely, to ensure that connection verifier 310 is properly arranged around the tube end form of the fluid connection. For example, and with reference to FIG. 7, when connection verifier 310 is properly positioned on fluid connection 160, the line-of-sight between optical transmitter 370A and optical receiver 370B is broken and the optical signal never reaches optical receiver 370B. This is a requirement that will be considered by haptic 500 when determining if a fluid connection is properly connected. For example, if haptic 500 determines that two protrusions are present (i.e., two of sensors 372 indicate an increased load with respect to the other sensors) and the line-of-sight between optical transmitter 370A and optical receiver 370B is broken (i.e., optical receiver 370B does not receiver the optical signal propagated by optical transmitter 370A), the haptic 500 indicates a verified connection (e.g., by vibrating, activating a light, activating a sound/alarm). In some embodiments, body 340 comprises holes directly in front of optical transmitter 370A and optical receiver 370B, with fillers/plugs (e.g., plastic) arranged therein to allow transmission of the optical signal therethrough.

In some embodiments, connection verifier 310 is connected to haptic 500 via wire 502 and port 374. Power may be supplied to connection verifier 310 via wires 502 and 504. Haptic 500 may comprise a central processing unit (CPU). Haptic 500 may determine and indicate to a user whether a fluid connection is properly secured. Haptic 500 receives one or more signals from circuit 360, namely, whether any of sensors 272 are incurring an increased load and whether optical receiver 370B is receiving the optical signal transmitted by optical transmitter. In some embodiments, if haptic 500 determines that two or more of sensors 372 are experiencing an increased load and that optical receiver 370B is not receiving the optical signal from optical transmitter 370A, then haptic 500 will indicate that the fluid connection is verified. Haptic 500 may provide feedback (e.g., vibration, indicator lights, indicator sounds) to indicate that the fluid connection is verified or not verified. Circuit 360 may further comprise ground connection 375.

Circuit 360 is any suitable circuit that indicates when sensors 372 detect a suitable force at one or more (e.g., two) circumferential locations, thereby indicating a secure (or unsecure) fluid connection. In some embodiments, circuit 360 and/or haptic 500 comprises an indicator device, such as an indicator light, to activate when sensors 372 detect a suitable force at one or more (e.g., two) circumferential locations and the optical signal is not detected by optical receiver 370B, thereby indicating a secure connection. In some embodiments, circuit 360 and/or haptic 500 comprises a vibration device (e.g., vibration motor) such that when sensors 372 detect a suitable force at one or more (e.g., two) circumferential locations and the optical signal is not detected by optical receiver 370B, the vibration device vibrates connection verifier 310 and/or haptic 500 to indicate a secure connection. For example, the vibration device may be arranged in haptic 500 which can take the form of a motor with an eccentric cam that vibrates or a piezo device that vibrates in response to an applied waveform. The piezo device can also produce an audible output. In some embodiments, circuit 360 and/or haptic 500 comprises a sound device (e.g., a speaker and any other necessary sound equipment) such that when sensors 372 detect a suitable force at one or more (e.g., two) circumferential locations and the optical signal is not detected by optical receiver 370B, the speaker outputs a noise to indicate a secure connection. Circuit 360 and/or haptic 500 may further comprise a microcontroller which contains one or more CPUs along with memory and programmable input/output peripherals. As is discussed in greater detail below, the microcontroller may be used to: activate the indicator light, vibration device, or other indicator device, upon verification of a secure connection, initiate, using a transmission device, the transmission of a signal to a receiver at a remote location indicating a secure connection (or an unsecure connection), and activate a tool failure indicator.

Connection verifier 310 may further comprise a transmission device that is electrically connected to circuit 360 and optionally a memory device or a microcontroller. The transmission device is arranged to transmit a signal to a remote location indicating that a fluid connection is secure, or unsecure. In some embodiments, the transmission device is arranged to send a signal via an electrical cable such as a wire or a fiber optic cable (i.e., a physical form of connection). The transmission device may use inter-integrated circuit ($I^2C$), controller area network (CAN), local interconnect network (LIN), or any suitable communication protocol known in the art. In some embodiments, the transmission device is arranged to send a wireless communication to a receiver at a remote location which records the data sent (i.e., whether the fluid connection is securely connected, or not). The transmission device may transmit the data using any suitable method known in the art, for example, Bluetooth® communication, radio frequency, infrared, and Wi-Fi® communication. In some embodiments, the transmission device may transmit the fluid connection identification number, the connection verifier identification number, the remaining life of the connection verifier, the vehicle identification number (VIN), the part number (e.g., engine, radiator, etc.) and serial number for that part, verification that a fluid connection is secure, and/or verification that a fluid connection is not secure. In some embodiments, connection verifier 310 can operate in conjunction with another device, such as a computer, to allow an electronic record to be kept of each inspection, and print a pass/fail label.

Connection verifier 310 may further comprise a tool failure indicator, such as a light, a vibration device, or a sound device, to indicate that connection verifier 310 should be replaced. In this embodiment, connection verifier 310 could, for example, include a memory device or a microcontroller that is programed with a predefined number, such that when connection verifier 310 is used a number of times equal to that predefined number, the tool failure indicator activates (i.e., the light turns on, the vibration device vibrates, the sound device creates a sound). The microcontroller may also tally the number of times connection verifier 210 is used, and using a preset remaining life calculation with a safety factor, continuously determine the remaining life of connection verifier.

Similar to the procedure discussed above with respect to connection verifiers 210 and 210, to verify that fluid connection 160 is securely connected, connection verifier 310 is first arranged around tube end form 120 through opening 311. Connection verifier 310 is then slid down tube end form 120 in axial direction AD1 until in the engaged position. Connection verifier 310 is slid down tube end form 120 in axial direction AD1 until probe 392, specifically engaging edge 396, contacts snap ring 150 or shoulder surface 128. The user applies a force to top surface 322 or connection verifier 310 that is equal to or greater than a predetermined threshold. If leading edge 396 is in contact with one or more protrusions, the user applied force creates a force on probe 392 (i.e., one or more of sections 392A-H), which is detected by one or more sensors 372 that are arranged at the circumferential position of the one or more protrusions. The sensor that detects the force of the protrusion on probe 392 will read at a higher level of force than the adjacent or other sensors, which indicates that a protrusion exists and that protrusion has properly "snapped" over shoulder 127. In some embodiments, if sensors 372 detect that at least two protrusions have properly "snapped" over shoulder 127, then it is determined that fluid connection 160 is properly connected.

Specifically, probe 392 is slid between radially outward facing surface 130 and radially inward facing surface 144 to engage one or more of protrusions 150A-C of snap ring 150. If snap ring 150 is not arranged on fluid connector 140, then engaging edge 396 would continue down to shoulder surface 128. The user applied force would, in this instance, create a force on probe 392; however, the force on probe 392 would be equally distributed about engaging edge 396. As such, sensors 372A-H would all read at the same level of force, which indicates that no protrusion is present and that snap ring 150 is either not connected or not connected properly to fluid connection 160. Sensors 372 detect the pressure gradient or change in force along the circumference of probe 392, and circuit 360 and/or microcontroller and/or computer determine, based on the pressure gradient, whether there is a presence of one or more protrusions and if so, if tube end form 120 is properly connected to fluid connector 140.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Connection verifier
11 Opening
20 Cap
21 Opening
22 Top surface
24 Bottom surface
26 Radially inward facing surface
28 Radially outward facing surface 30 Plug section
40 Body
41 Opening
42 Top surface
44 Bottom surface
46 Radially inward facing surface
48 Radially outward facing surface
50 Plug section
52 Bottom surface
54A Vertical member
54B Vertical member
54C Vertical member
56 Aperture
60 Circuit (or circuit board)
61 Opening
62 Top surface
64 Bottom surface
66 Radially inward facing surface
68 Radially outward facing surface
70A Sensor
70B Sensor
70C Sensor
72A Sensor
72B Sensor
72C Sensor
72D Sensor
72E Sensor
72F Sensor
72G Sensor
72H Sensor
72I Sensor
72J Sensor
72K Sensor
72L Sensor
80 Boot
81 Opening
82 Top surface
84 Bottom surface
86 Radially inward facing surface
88 Radially outward facing surface
90 Surface
91 Aperture
92 Probe
93 Aperture
94 Radially inward facing surface
96 Engaging edge
98 Surface
100 Platforms
120 Tube end form
121 Through-bore
122 End
123 Section
124 Radially outward facing surface
126 Radially outward facing surface
127 Shoulder
128 Shoulder surface
129 Section
130 Radially outward facing surface
132 End
140 Fluid connector
142 Through-bore
144 Radially inward facing surface
146 Radially inward facing surface
148 Radially outward facing surface
149 Groove
150 Snap ring
152A Protrusion
152B Protrusion
152C Protrusion
160 Fluid connection
210 Connection verifier
211 Opening
220 Cap
221 Opening
222 Top surface
224 Bottom surface
226 Radially inward facing surface
228 Radially outward facing surface
230 Plug section
240 Body
241 Opening
242 Top surface
244 Bottom surface
246 Radially inward facing surface
248 Radially outward facing surface
250 Plug section
252 Bottom surface
254A Vertical member
254B Vertical member
254C Vertical member
256 Aperture
260 Circuit (or circuit board)
261 Opening
262 Top surface
264 Bottom surface
266 Radially inward facing surface
268 Radially outward facing surface
270A Sensor
270B Sensor
270C Sensor
272A Sensor
272B Sensor
272C Sensor
272D Sensor
272E Sensor
272F Sensor
272G Sensor
272H Sensor
272I Sensor
272J Sensor
272K Sensor
272L Sensor
280 Boot
281 Opening
282 Top surface
284 Bottom surface
286 Radially inward facing surface
288 Radially outward facing surface
290 Surface
291 Aperture
292 Probe
293 Aperture
292A Probe
292B Probe
292C Probe
292D Probe
292E Probe
292F Probe
292G Probe
292H Probe
294 Radially inward facing surface
296 Engaging edge
298 Surface
300 Platforms 302 Slits
310 Connection verifier
311 Opening
320 Cap
321 Opening
322 Top surface
324 Bottom surface
326 Radially inward facing surface
328 Radially outward facing surface
330 Aperture
340 Body
341 Opening
342 Top surface
344 Bottom surface
346 Radially inward facing surface
348 Radially outward facing surface
350 Plug
352 Bottom surface
360 Circuit (or circuit board)
361 Opening
362 Top surface
364 Bottom surface
366 Radially inward facing surface
368 Radially outward facing surface
370A Transmitter (or receiver)
370B Receiver (or transmitter)
372 Sensor(s)
372A Sensor
372B Sensor
372C Sensor
372D Sensor
372E Sensor
372F Sensor
372G Sensor
372H Sensor
374 Port
375 Ground connection
376 Preload element
378 Spacer
380 Boot
381 Opening
382 Surface
384 Bottom surface
386 Radially inward facing surface
388 Radially outward facing surface
390 Protrusion
391 Aperture
392 Probe
392A Section
392B Section
392C Section
392D Section
392E Section
392F Section
392G Section
392H Section
393 Surface
394 Radially inward facing surface
396 Engaging edge
400 Platforms
402 Slits
500 Haptic
502 Wire
504 Wire
F Force
AD1 Axial direction
AD2 Axial direction

What is claimed is:

1. A connection verifier, comprising:
a boot, including:
a first top surface;
a first bottom surface;
a first radially outward facing surface;
a first radially inward facing surface;
a first aperture arranged between the radially outward facing surface and the first radially inward facing surface; and
a probe extending from the first bottom surface; and
a circuit arranged in the first aperture proximate the first bottom surface, the circuit configured to detect a force applied to the probe.

2. The connection verifier as recited in claim 1, wherein the circuit comprises:
a second top surface; and
a second bottom surface including one or more input sensors circumferentially arranged thereon, the one or more input sensors operatively arranged to detect the force.

3. The connection verifier as recited in claim 2, further comprising a preload element operatively arranged between the boot and the second bottom surface to apply a preload to the one or more input sensors.

4. The connection verifier as recited in claim 1, wherein the probe comprises one or more sections separated by one or more slits.

5. The connection verifier as recited in claim 1, further comprising a body arranged to engage the boot and secure the circuit in the first aperture.

6. The connection verifier as recited in claim 5, wherein the body comprises:
a second top surface;
a second bottom surface;
a second radially outward facing surface;
a second radially inward facing surface; and
a plug section extending from the second bottom surface and arranged to engage the first aperture.

7. The connection verifier as recited in claim 1, further comprising a haptic connected to the circuit, wherein the haptic provides feedback in the form of vibration, light, and/or sound.

8. The connection verifier as recited in claim 1, wherein the probe comprises an engaging edge operatively arranged to engage a snap ring of a fluid connection.

9. The connection verifier as recited in claim 2, wherein the circuit is operatively arranged to compare input forces detected by each of the one or more input sensors to determine if the fluid connection is properly connected.

10. The connection verifier as recited in claim 8, further comprising an opening arranged to engage a tube end form of the fluid connection.

11. The connection verifier as recited in claim 10, wherein the circuit further comprises an optical sensor operatively arranged to detect if the connection verifier is properly arranged around the tube end form.

12. A connection verifier for engaging a fluid connection including a tube end form, a fluid connector, and a snap ring having one or more protrusions, the connection verifier comprising:
a boot, including:
a first top surface;
a first bottom surface;
a first radially outward facing surface;
a first radially inward facing surface;

a first aperture arranged between the first radially outward facing surface and the first radially inward facing surface; and
a probe including an engaging edge operatively arranged to engage the snap ring;
a circuit arranged in the first aperture and configured to detect a force applied to the probe; and
a body arranged to engage the first aperture and enclose the circuit within the boot.

13. The connection verifier as recited in claim 12, wherein the circuit comprises:
a second top surface; and
a second bottom surface including one or more input sensors circumferentially arranged thereon, the one or more input sensors operatively arranged to detect the force.

14. The connection verifier as recited in claim 13, further comprising a preload element operatively arranged between the boot and the second bottom surface to apply a preload to the one or more input sensors.

15. The connection verifier as recited in claim 12, wherein the probe comprises one or more sections circumferentially separated by one or more spaces.

16. The connection verifier as recited in claim 13, wherein the circuit is operatively arranged to compare input forces detected by each of the one or more input sensors to determine if the fluid connection is properly connected.

17. The connection verifier as recited in claim 12, further comprising an opening arranged to engage the tube end form.

18. The connection verifier as recited in claim 12, wherein the circuit further comprises an optical sensor operatively arranged to detect if the connection verifier is properly arranged on the tube end form.

19. The connection verifier as recited in claim 12, further comprising a haptic connected to the circuit, wherein the haptic includes a feedback device.

20. A connection verifier for engaging a fluid connection including a tube end form, a fluid connector, and a snap ring having one or more protrusions, the connection verifier comprising:
a boot, including:
an aperture; and
a probe having a leading edge operatively arranged to engage the snap ring; and,
a circuit arranged in the aperture, the circuit configured to detect one or more forces applied to the leading edge;
wherein the connection verifier is operatively arranged to determine if the fluid connection is properly connected based on the one or more forces applied to the leading edge.

* * * * *